(12) United States Patent
Takeda et al.

(10) Patent No.: US 7,695,045 B2
(45) Date of Patent: Apr. 13, 2010

(54) DRIVING POSITION ADJUSTING DEVICE

(75) Inventors: Yusaku Takeda, Hiroshima (JP); Tomonori Ohtsubo, Hiroshima (JP); Hiroki Uemura, Hiroshima (JP); Naoki Yamada, Hiroshima (JP)

(73) Assignee: Mazda Motor Corporation (JP)

( * ) Notice: Subject to any disclaimer, the term of this patent is extended or adjusted under 35 U.S.C. 154(b) by 95 days.

(21) Appl. No.: 12/037,450

(22) Filed: Feb. 26, 2008

(65) Prior Publication Data

US 2008/0231090 A1 Sep. 25, 2008

(30) Foreign Application Priority Data

Mar. 30, 2007 (JP) ............................. 2007-093497
Mar. 30, 2007 (JP) ............................. 2007-093600

(51) Int. Cl.
  *B60N 3/06* (2006.01)
  *B60N 2/06* (2006.01)
  *B60N 2/18* (2006.01)

(52) U.S. Cl. ..................................... 296/75; 296/97.23

(58) Field of Classification Search ................... 74/560, 74/564; 180/326, 330; 296/75, 97.23
See application file for complete search history.

(56) References Cited

U.S. PATENT DOCUMENTS

| | | | |
|---|---|---|---|
| 2,862,761 A * | 12/1958 | Scheidegger | 296/75 |
| 3,288,239 A * | 11/1966 | Ristau | 180/78 |
| 3,357,717 A * | 12/1967 | Samford | 280/775 |
| 4,392,546 A * | 7/1983 | Brown et al. | 180/326 |
| 5,183,308 A * | 2/1993 | Koga et al. | 296/75 |
| 6,318,785 B1 * | 11/2001 | Tousignant | 296/75 |
| 6,450,530 B1 * | 9/2002 | Frasher et al. | 280/735 |
| 6,474,728 B1 * | 11/2002 | Mendis et al. | 296/204 |
| 6,614,344 B1 * | 9/2003 | Frasher et al. | 340/425.5 |
| 6,634,669 B2 * | 10/2003 | Levine | 280/735 |
| 7,364,186 B2 * | 4/2008 | Levine | 280/731 |
| 7,437,229 B2 * | 10/2008 | Ohtsubo et al. | 701/49 |

(Continued)

FOREIGN PATENT DOCUMENTS

FR 2631292 A1 * 11/1989

(Continued)

OTHER PUBLICATIONS

European Search Report; EP 08005674; Jul. 28, 2008.

*Primary Examiner*—Glenn Dayoan
*Assistant Examiner*—Paul A Chenevert
(74) *Attorney, Agent, or Firm*—Studebaker & Brackett PC; Donald R. Studebaker

(57) ABSTRACT

A driving position adjusting device comprises a seat-position adjusting mechanism to adjust height and seat-face angle of a seat cushion in accordance with longitudinal movement of a driver's seat, and a floor adjusting mechanism to adjust a height of a floor board in accordance with the operation of the longitudinal adjustment of the driver's seat, wherein the seat-position adjusting mechanism is configured so that an inclination angle of the seat cushion becomes smaller as the driver's seat is moved forward from a middle position, and the floor adjusting mechanism is configured so that the height of the floor board becomes higher as the driver's seat is moved forward from the middle position. Accordingly, the sitting position of the driver and the operational function of the operational pedal can be provided properly regardless of the body size of the driver.

8 Claims, 15 Drawing Sheets

U.S. PATENT DOCUMENTS

| | | | |
|---|---|---|---|
| 7,556,307 B2 * | 7/2009 | Ohtsubo et al. | 296/75 |
| 2005/0109555 A1 | 5/2005 | Ohtsubo et al. | |
| 2007/0205626 A1 * | 9/2007 | Ohtsubo et al. | 296/75 |

FOREIGN PATENT DOCUMENTS

| | | |
|---|---|---|
| FR | 2689081 A1 * | 10/1993 |
| JP | 2006-044422 | 2/2006 |

* cited by examiner

DRIVING POSITION ADJUSTING DEVICE

BACKGROUND OF THE INVENTION

The present invention relates to a driving position adjusting device that adjusts a driving position of a driver seated in a driver's seat properly.

Conventionally, such a driving position adjusting device is known as disclosed in Japanese Patent Laid-Open Publication No. 2006-44422, for example, which comprises a body-size detecting means for detecting a body size of a driver, an operational pedal, such as a brake pedal, to be pressed-operated by the driver, a movable floor portion that is provided near the operational pedal so as to be movable vertically, and a movable-floor-portion adjusting means for adjusting the height of the movable floor portion. Herein, the movable-floor-portion adjusting means is configured so that the adjusted height of the movable floor portion is changeable in accordance with the body size of the driver detected by the body-size detecting means in such a manner that the height of the movable floor portion becomes higher when the driver's body size is smaller. Further, the above-described driving position adjusting device further comprises a seat adjusting means that can move a seat cushion of the driver's seat in a vehicle longitudinal direction so as to adjust a vertical position and a longitudinal position of the seat cushion and also adjust an inclination angle of the seat cushion, so that the sitting position can be properly adjusted in accordance with the body size of the driver so as to provide appropriate positions of driver's eyes and its relative position to a steering wheel.

According to the above-described driving position adjusting device, the proper adjustment of the moving amount (height) of the movable floor portion may improve the operational function of the operational pedal. However, since the longitudinal position, vertical position and inclination angle of the seat cushion are respectively changed in accordance with the body size of the driver as described above, the sitting position of the driver would change too much. Thus, there is a problem in that it would be difficult to adjust the moving amount (height) of the movable floor portion properly, so that the position of the driver would be unstable or the operational function of the operational pedal would deteriorate.

That is, in a case where the drivers change, the new driver may try to move the driver's seat to a proper position for him/her by operating a seat-position adjusting mechanism so that the appropriate front view can be obtained by placing the height of his/her eye point on the appropriate eye line. Herein, however, since the vertical position and the inclination angle of the seat cushion change at the same time in accordance with the longitudinal movement of the driver's seat, the sitting position of the driver, more specifically, an upright angle of the driver's upper body relative to the horizontal line, a knee angle of the driver that is a bending angle between the driver's thigh portion and knee-lower portion and the like may change, and the operational function of the operational pedal may change accordingly. Accordingly, there is a problem in that even if the position of the movable floor portion was adjusted merely based on the size of the driver's foot according to the body size of the driver, both the sitting position of the driver and the operational function of the operational pedal could not be improved properly at the same time.

Meanwhile, another type of driving position adjusting device is disclosed in U.S. Patent Application Publication No. 2005/0109555 A1. This device can provide various useful advantages, but it might still have room for improvement in solving the above-described particular problem.

SUMMARY OF THE INVENTION

The present invention has been devised in view of the above-described problem, and an object of the present invention is to provide a driving position adjusting device that can provide the sitting position of the driver and the operational function of the operational pedal properly regardless of the body size of the driver.

According to the present invention, there is provided a driving position adjusting device, comprising a seat-position adjusting mechanism operative to adjust a longitudinal position, a height and a seat-face angle of a seat cushion of a driver's seat, the longitudinal position of the seat cushion of the driver's seat adjusted by the seat-position adjusting mechanism being configured to be changeable within an adjustable longitudinal range of the driver's seat, and a movable-floor-portion adjusting mechanism operative to adjust a height of a movable floor portion, the movable floor portion being provided for a foot portion of a driver that is to be placed thereon, wherein the seat-position adjusting mechanism is configured so that the adjusted seat-face angle of the seat cushion is changeable in accordance with the longitudinal position of the seat cushion at least in a specified area within the adjustable longitudinal range of the seat cushion of the driver's seat in such a manner that an inclination angle of the seat face of the seat cushion relative to a horizontal face becomes smaller as the seat cushion of the driver's seat is moved forward, and the movable-floor-portion adjusting mechanism is configured so that the adjusted height of the movable floor portion is changeable in accordance with the longitudinal position of the seat cushion at least in the specified area within the adjustable longitudinal range of the seat cushion of the driver's seat in such a manner that the height of the movable floor portion becomes higher as the seat cushion of the driver's seat is moved forward.

According to the present invention, by the operation of the seat-position adjusting mechanism, the sitting position can be provided properly regardless of the size of the driver and the driver's eye point can be placed on the appropriate eye line. At the same time, by the operation of the movable-floor-portion adjusting mechanism, an appropriate position of the foot's sole of the driver can be located at an operational point of the operational pedal surely regardless of the size of the driver, thereby providing the proper operational function of the operational pedal.

According to an embodiment of the present invention, the specified area within the adjustable longitudinal range of the seat cushion of the driver's seat is configured to be a front-located area that substantially covers a middle position of the adjustable longitudinal range and a forward area from the middle position, whereby the inclination angle of the seat face of the seat cushion relative to the horizontal face can become smaller as the seat cushion of the driver's seat is moved forward from the middle position, whereby the height of the movable floor portion can become higher as the seat cushion of the driver's seat is moved forward from the middle position. Thereby, in a case where relatively-short drivers sit in the driver's seat, the driver's seat is operated so as to be moved forward to respective appropriate forward positions from the middle position in the adjustable longitudinal range, and the angles of the seat face are changed in a direction that its inclination angle relative to the horizontal face becomes smaller, so that respective sitting centers of the drivers on the seat cushion can be moved forward and upward suitably for the relatively-short drivers and respective upper bodies of the relatively-short drivers can be positioned in relatively upright states. Accordingly, as described above in the present invention, the sitting position can be provided properly regardless of the size of the driver, even for the relatively-short drivers, and the driver's eye point can be placed on the appropriate eye line. Further, in the case where the driver is changed from the relatively-middle-height drivers to the relatively-short drivers as described above, the height of the movable floor portion is adjusted so as to become higher. Accordingly, as described above in the present invention, the appropriate positions of the foot's soles of the drivers can be located at the respective operational points of the operational pedal surely regardless of the size of the driver, even for the relatively-short drivers, thereby providing the proper operational function of the operational pedal.

According to another embodiment of the present invention, wherein the movable-floor-portion adjusting mechanism is further configured so that a changing rate of the height of the movable floor portion that becomes higher is changeable in accordance with the longitudinal position of the seat cushion in such a manner that the changing rate of the height of the movable floor portion decreases as the seat cushion of the driver's seat is moved forward from the middle position. Thereby, the forward-movement range of the driver's seat can be properly narrowed and the driving position can be properly adjusted regardless of the size of the driver, even for the relatively-short drivers, preventing improperly close approach to a steering handle or a gear-changing shift knob, without any deterioration of the operational function. Further, in a case where the driving position is adjusted by many average drivers, i.e., the relatively-middle-height drivers, the position adjustment of the seat cushion and the height adjustment of the movable floor portion can be conducted properly, making the sitting position set to the appropriate position substantially.

According to another embodiment of the present invention, the specified area within the adjustable longitudinal range of the seat cushion of the driver's seat is configured to be a rear-located area that substantially covers a middle position of the adjustable longitudinal range and a rearward area from the middle position, whereby the inclination angle of the seat face of the seat cushion relative to the horizontal face can become greater as the seat cushion of the driver's seat is moved rearward from the middle position, whereby the height of the movable floor portion can become lower as the seat cushion of the driver's seat is moved rearward from the middle position. Thereby, in a case where relatively-tall drivers sit in the driver's seat, the driver's seat is operated so as to be moved rearward to respective appropriate rearward positions from the middle position in the adjustable longitudinal range, and the angles of the seat face are changed in a direction that its inclination angle relative to the horizontal face becomes greater, so that respective sitting centers of the drivers on the seat cushion can be moved rearward and downward suitably for the relatively-tall drivers and respective upper bodies of the relatively-tall drivers can be positioned in relatively reclined states. Accordingly, as described above in the present invention, the sitting position can be provided properly regardless of the size of the driver, even for the relatively-tall drivers, and the driver's eye point can be placed on the appropriate eye line. Further, in the case where the driver is changed from the relatively-middle-height drivers to the relatively-tall drivers as described above, the height of the movable floor portion is adjusted so as to become lower. Accordingly, as described above in the present invention, the appropriate positions of the foot's soles of the drivers can be located at the respective operational points of the operational pedal surely regardless of the size of the driver, even for the relatively-tall drivers, thereby providing the proper operational function of the operational pedal.

According to another embodiment of the present invention, the movable-floor-portion adjusting mechanism is further configured so that a changing rate of the height of the movable floor portion that becomes lower is changeable in accordance with the longitudinal position of the seat cushion in such a manner that the changing rate of the height of the movable floor portion decreases as the seat cushion of the driver's seat is moved rearward from the middle position. Thereby, the rearward-movement range of the driver's seat can be properly narrowed and the driving position can be properly adjusted regardless of the size of the driver, even for the relatively-tall drivers, preventing improperly close approach to the steering handle or the gear-changing shift knob, without any deterioration of the operational function. Further, in a case where the driving position is adjusted by many average drivers, i.e., the relatively-middle-height drivers, the position adjustment of the seat cushion and the height adjustment of the movable floor portion can be conducted properly, making the sitting position set to the appropriate position substantially.

According to another embodiment of the present invention, the driver's seat comprises a seat back that is provided substantially in an upright state at a rear portion of the seat cushion, and the seat cushion and the seat back of the driver's seat are configured to change positions thereof together when the seat-position adjusting mechanism operates to adjust the seat-face angle of the seat cushion. Thereby, the sitting position of the driver can be held in the proper state, and the driver's eye point can be placed on the appropriate eye line accurately and easily, without improperly-great movements of the seat cushion in the longitudinal and vertical directions.

Other features, aspects, and advantages of the present invention will become apparent from the following description which refers to the accompanying drawings.

Figure 1:
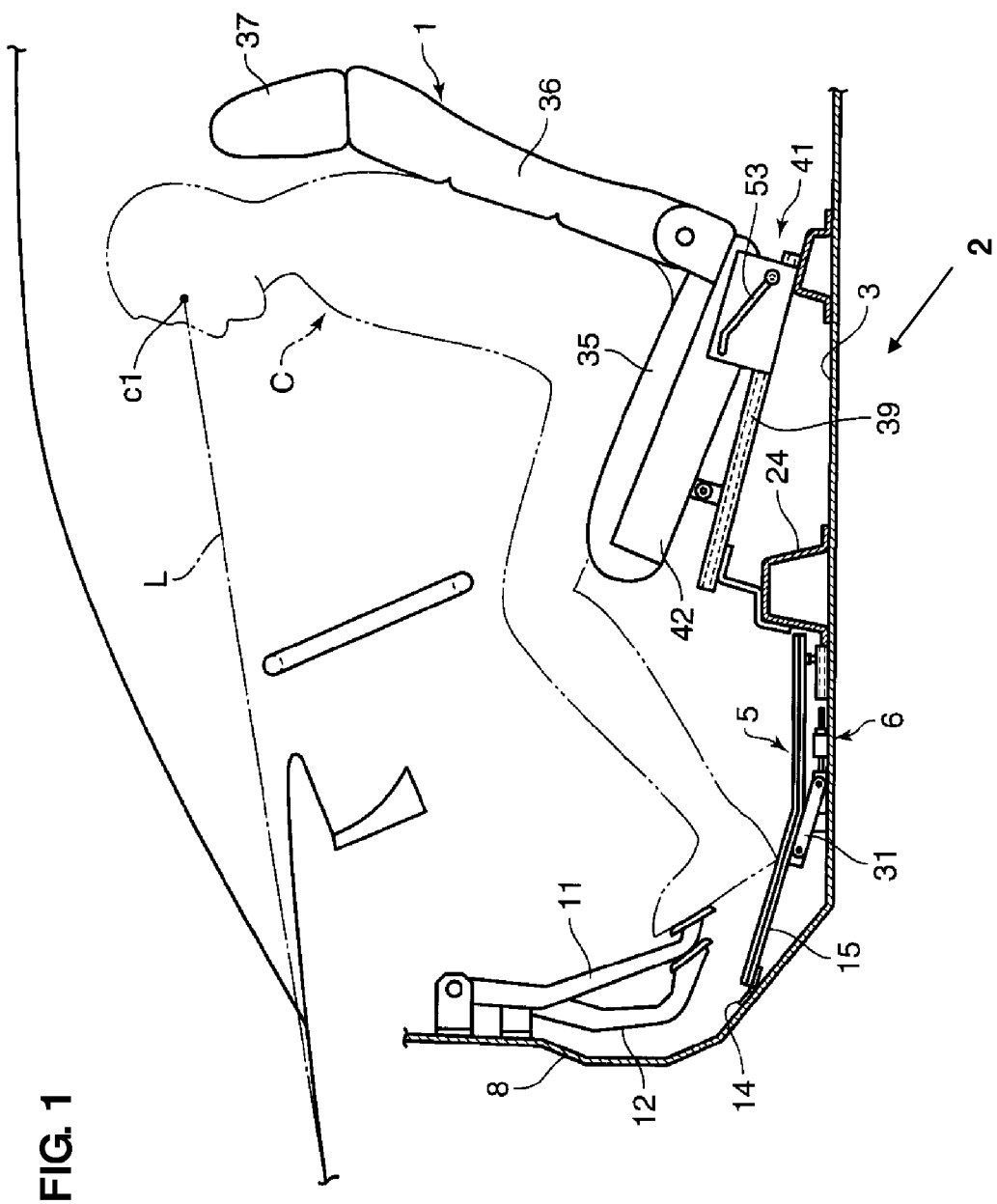
FIG. 1 is an explanatory diagram showing an embodiment of a driving position adjusting device according to the present invention.
Figure 2:
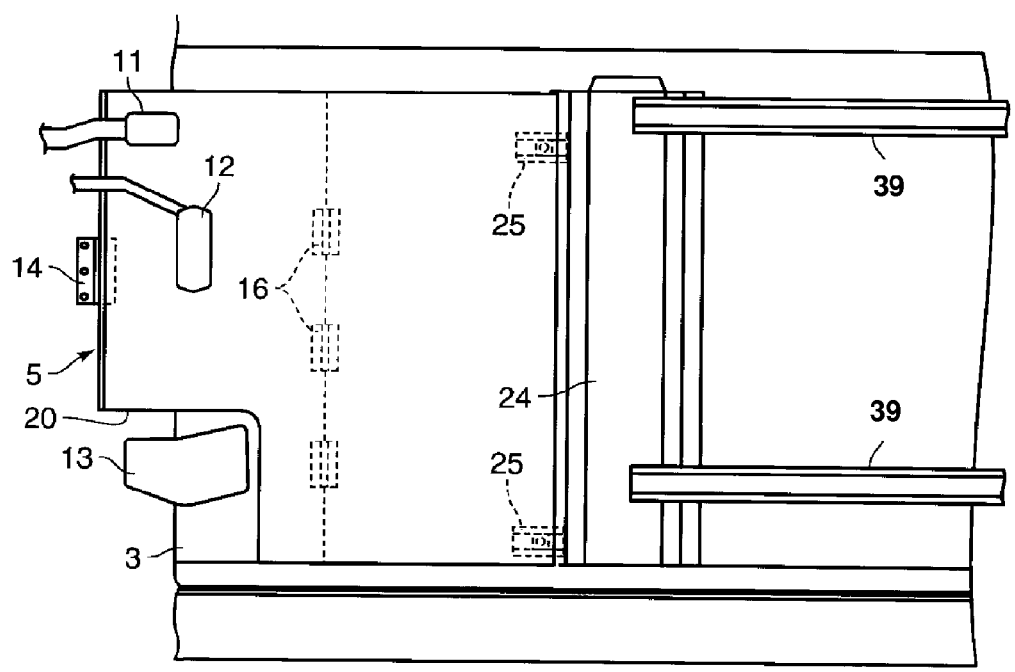
FIG. 2 is a plan view showing a specific structure of a movable floor portion.

Hereinafter, a preferred embodiment of the present invention will be described referring to the accompanying drawings.

DETAILED DESCRIPTION OF THE INVENTION

FIGS. 1-4 show an embodiment of a driving position adjusting device according to the present invention. The driving position adjusting device comprises a seat-position adjusting mechanism 2 that adjusts a longitudinal position, a height and a seat-face angle of a seat cushion 35 of a driver's seat 1, and a floor moving mechanism (movable-floor-portion adjusting mechanism) 6 that adjusts a height of a movable floor portion that is provided for a heel portion of a foot of the driver that is placed thereon when the driver seated in the driver's seat 1 operates an operational pedal, such as an accelerator pedal 11 or a brake pedal 12, i.e., a floor board 5 that is provided at a location of the driver's foot portion so as to cover an upper face of a vehicle floor 3.

Figure 3:
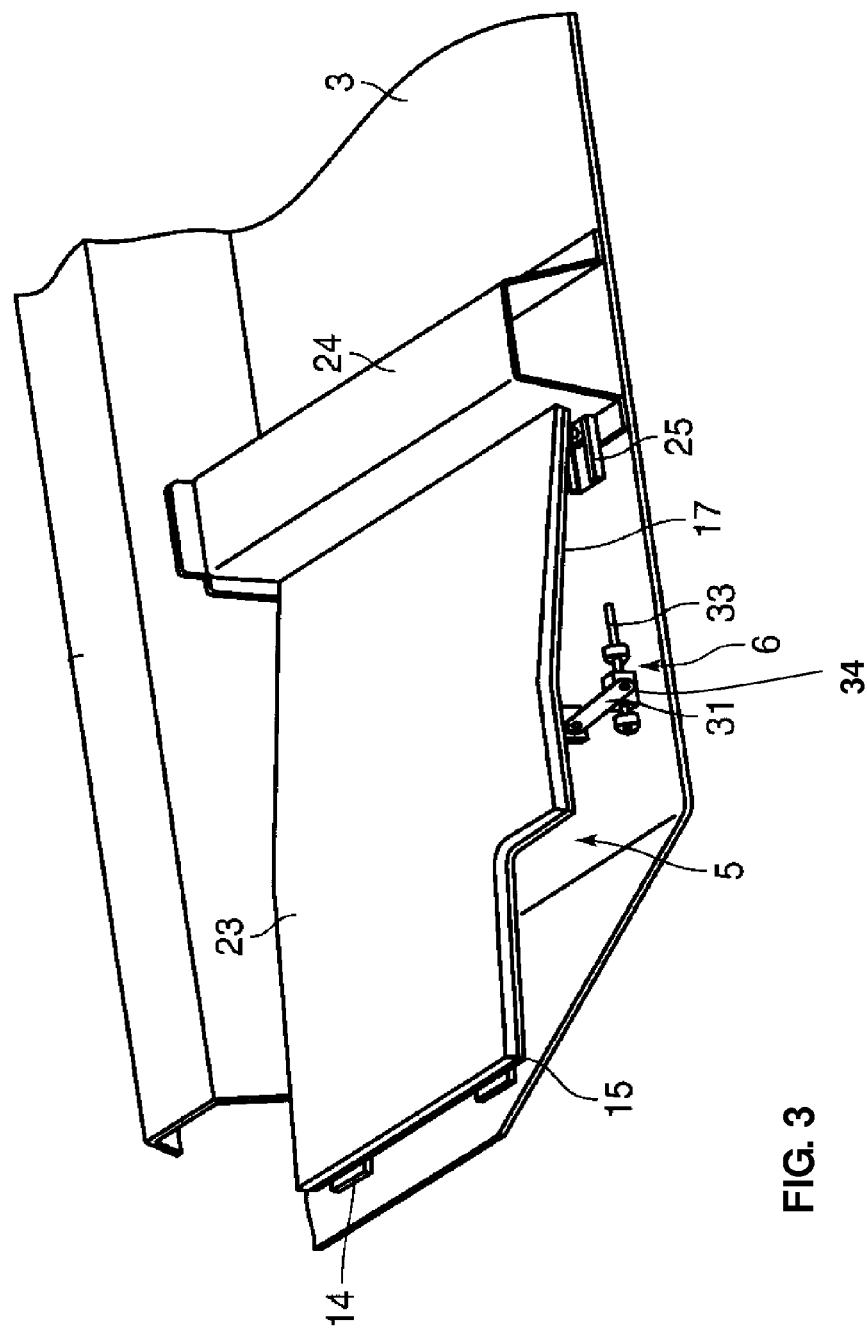
FIG. 3 is a perspective view showing the specific structure of the movable floor portion.
Figure 4:
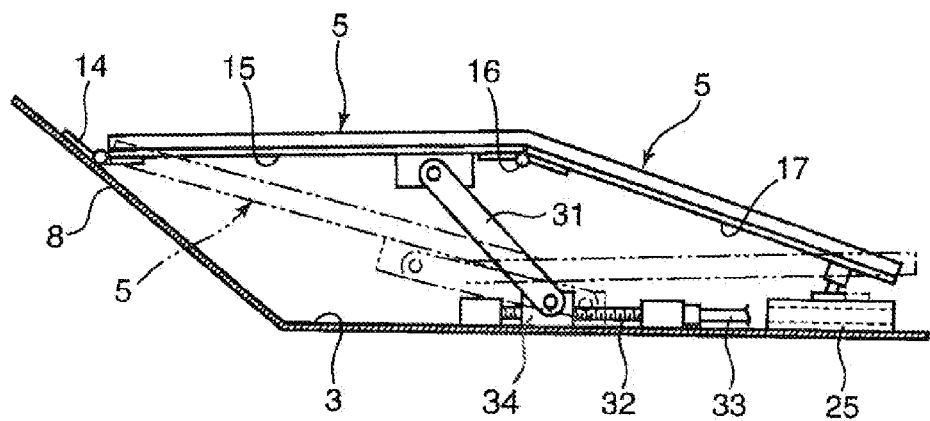
FIG. 4 is a sectional view showing a support structure of a rear-side portion of a floor board, when viewed from the side.

On the upper face of the vehicle floor 3 is provided a well known floor trim member (not illustrated), which comprises an insulator that is made of felt, glass wool or the like and has a sound insulation function, a heat insulation function and so on and a skin member that is made of carpet material or the like and covers an upper face of the insulator. A reference character 13 denotes a footrest in FIG. 2. The floor board 5 comprises, as shown in FIGS. 3 and 4, a front-side board 15, a front end portion of which is pivotally supported at a lower end portion of a dash panel 8 via a hinge member 14, and a rear-side board 17, a front end of which is coupled to a rear end portion of the front-side board 15 via a hinge member 16 so as to bend. A front portion of the front-side board 15 is located below the operational pedal, such as the accelerator pedal 11, brake pedal 12, and a side portion of the front-side board 15 has a recess portion as an interference-avoidance portion 20 that functions to avoid its interference with the footrest 13.

The rear-side board 17 of the floor board 15 is configured so as to cover almost a whole part between a side sill provided at the side of the vehicle floor 3 and a floor tunnel provided at the center of the vehicle floor 3. Behind the floor board 5 is provided the driver's seat 1, and below of its front end portion is provided a cross member 24 that interconnects the floor tunnel and the side sill. A pair of guide rails 25, which supports a rear portion of the rear-side board 17 so as to slide, is provided in front of the cross member 24. Further, a sheet of mat member 23, which comprises a pile material and a back support member, is disposed so as to cover over the boards 15, 17.

Figure 5:
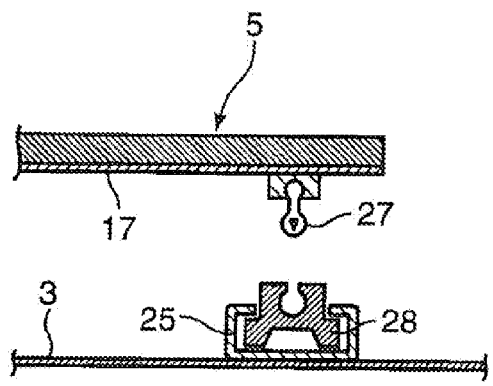
FIG. 5 is a sectional view showing a support structure of a rear-side portion of a floor board, when viewed from the front.

The guide rail 25 has a U-shaped cross section and holds a slider 28 therein as shown in FIGS. 4 and 5. The slider 28 is configured to detachably engage with a grommet 27 that is attached to a rear lower face of the rear-side board 17. The slider 28 is configured to slide along the guide rail 25 in accordance with a vertical movement of the floor board 5, which will be described later, so that the rear portion of the rear-side board 17 can be moved longitudinally with the support at the guide rail 25.

Figure 6:
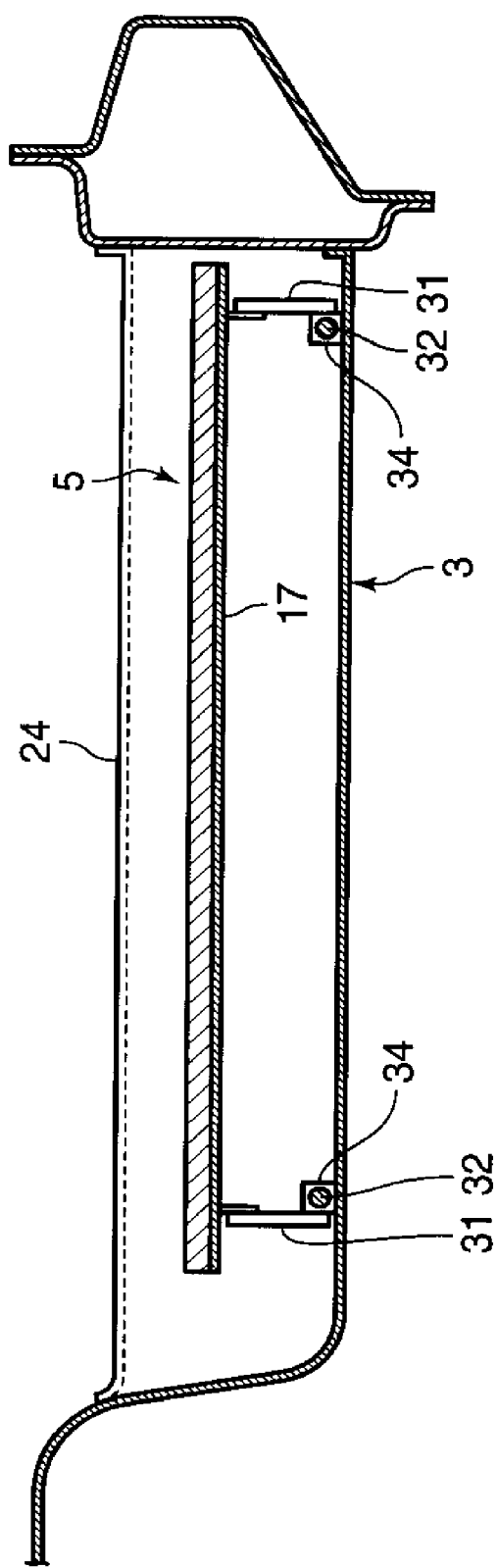
FIG. 6 is a sectional view showing a specific structure of a floor moving mechanism, when viewed from the front.

The floor moving mechanism 6 comprises, as shown in FIGS. 3, 4 and 6, a pair of drive links 31, front end portions of which are pivotally supported at a rear lower face of the front-side board 15, a pair of screw shafts 32, front and rear end portions of which are rotatably supported at the upper face of the vehicle floor 3 via journal members, a pair of drive cables 33 that drives the screw shafts 32, and a pair of slide blocks 34 that engages with the screw shafts 32 so as to slide along the upper face of the vehicle floor 3. A base end portion of the drive link 31 is pivotally supported at a side face of the slide block 34. Thus, the drive links 31, drive cables 33 and slide blocks 34 constitute the floor moving mechanism 6. This floor moving mechanism 6 is disposed below the floor board 5.

The drive cable 33 is made of a flexible, rotational-force transmittable member, so that the rotational force inputted from the seat-position adjusting mechanism 2 can be transmitted to the screw shaft 32 thereby. When the screw shaft 32 is driven by the rotational force so as to rotate in a regular direction, the slide block 34 is moved forward along the screw shaft 32. Thereby, the rear end portion of the drive link 31 is pushed forward, and the front end portion of the drive link 31 is pushed upward. As a result, the drive link 31 changes its position from a lying state from an upright state, and the rear side of the front-side board 15 is pushed upward by the drive link 31. Accordingly, the front-side board 15 rises, with a hinge support point of the hinge member 14, from its down position, which is illustrated by a broken line in FIGS. 1 and 4, to its up position, which is illustrated by a solid line in FIG. 4.

Meanwhile, the rear-side board 17 of the floor board 5 is connected to the rear end portion of the front-side board 15 via the hinge member 16 at the front side, so the front side of the board 17 is pushed upward in accordance with the rising movement of the front-side board 15. And, the rear-side portion of the rear-side board 17 is moved forward with the support at the guide rail. Thus, the connection portion between the front-side board 15 and the rear-side board 17 goes up, so that the floor board 5 changes to a bending state.

Further, when the screw shaft 32 is driven by the drive cable 33 in a reverse direction, the slide block 34 is moved rearward along the screw shaft 32. Thereby, the drive link 31 changes from its upright state to its lying state, and the rear side of the front-side board 15 is pushed downward by the drive link 31 from its up position, which is illustrated by the solid line in FIG. 4, to its down position, which is illustrated by the broken line in FIGS. 1 and 4. The rear-side board 17 moves to the down position that is located along the vehicle floor 3. The floor board 5 is adjusted based on the previously-set drive characteristic so as to go up or down in accordance with the longitudinal movement of the driver's seat 1 within an adjustable longitudinal range of the driver's seat 1, i.e., its forward movement from a middle position, its rearward movement from the middle position.

The driver's seat 1, which is a separate type of seat with a driver's side and a assistant's side, comprises the seat cushion 35 that forms a sitting face for the passenger, a seat back 36 that is provided substantially in an upright state at the rear portion of the seat cushion 35, and a headrest 37 that is attached to an upper end portion of the seat back 36. The longitudinal position and vertical positions of the seat cushion 35 and the disposition angle of the seat cushion 35 relative to the vehicle floor 3 are adjustable by the seat-position adjusting mechanism 2 on the vehicle floor 3.

Figure 7:
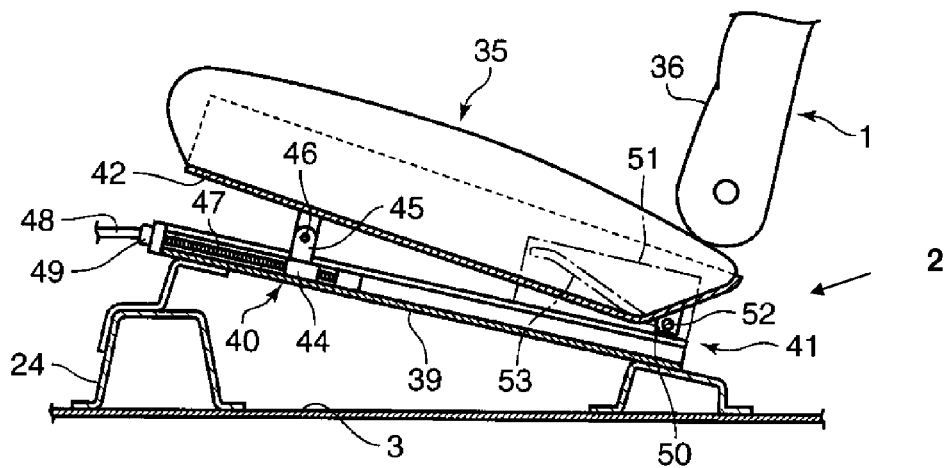
FIG. 7 is a sectional view showing a structure of a seat-position adjusting mechanism, when viewed from the side.
Figure 8:
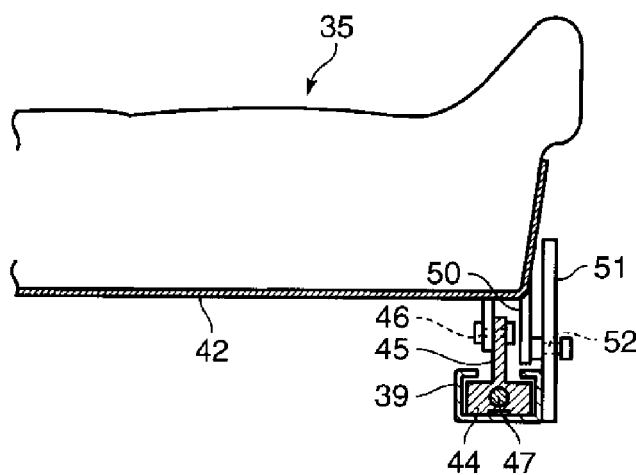
FIG. 8 is a sectional view showing the structure of the seat-position adjusting mechanism, when viewed from the front.

As shown in FIGS. 7 and 8, the seat-position adjusting mechanism 2 comprises a pair of seat rails 39 that is disposed on the vehicle floor 3 in a slant state with its higher front, a slide drive portion 40 that drives the seat cushion 35 of the driver's seat so as to slide along the seat rails 39, and a tilt drive portion 41 that drives the rear end portion of the seat cushion 35 so as to move upward or downward in accordance with the longitudinal movement of the driver's seat 1.

The seat cushion 35 has a cushion frame 42 that is provided so as to cover the cushion body portion from the bottom. Below the cushion frame 42 are provided the seat rails 39 having an upper-open U-shaped cross section. A slider 44 that has a projection piece 45 at its upper face is disposed in the seat rail 39 so as to slide. An upper end portion of the projection piece 45 is pivotally supported at a lower portion of the cushion frame 42 via a pivotal axis 46. Further, a screw hole to engage with the screw shaft 47 of the slide drive portion 40 is formed at the slider 44.

The screw shaft 47 of the slide drive portion 40 is disposed in the seat rail 39 and rotatably supported at a journal member at its front and rear end portions. Its rear end portion is connected to a drive motor (not illustrated) via a power transmission cable, not illustrated. A drive force is transmitted from the drive motor to the screw shaft 47 via the power transmission cable, so that the slider 44 is driven along the seat rail 39 by the rotation of screw shaft 47. A drive cable 48 operative to transmit a drive force to the floor moving mechanism 6 of the floor board 5 is connected to a front end portion of the screw shaft 47 via a coupling 49.

The tilt drive portion 41 of the seat-position adjusting mechanism 2 comprises a support plate 50 that projects from a rear lower portion of the cushion frame 42, a guide plate 51 that is fixed to the side face of the seat rail 39 so as to project vertically, and a guide pin 52 that projects from the support plate 50. The guide plate 51 has a guide groove 53 having a slant portion with its higher front. The guide pin 52 is guided by the groove 53. When the slider 44 is driven by the screw shaft 47 of the slide drive portion 40, the front portion of the seat cushion 35 is moved forward along the seat rail 39. Accordingly, the guide pin 52 slides along the guide groove 53 of the guide plate 51. Thereby, the rear portion of the seat cushion 35 is moved vertically so as to change an inclination angle of the seat cushion 35 relative to the horizontal face. Thus, the seat cushion 35 and the seat back 36 are driven so as to change their positions together.

Figure 9:
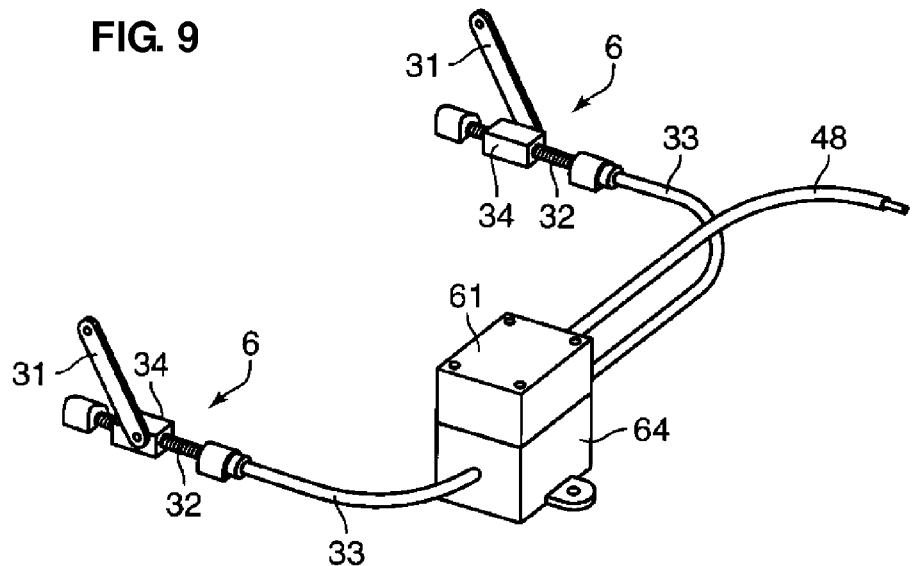
FIG. 9 is a perspective view showing a specific structure of a power transmitting mechanism.
Figure 10A:
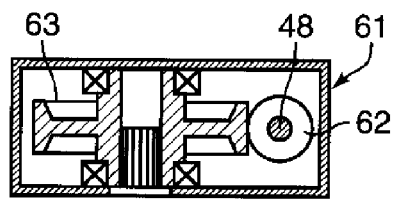
FIGS. 10A, 10B are sectional views showing the specific structure of the power transmitting mechanism.
Figure 10B:
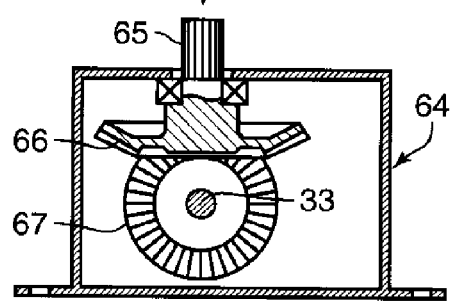

The drive cable 48 to transmit the drive force of the slide drive portion 40 to the floor moving mechanism 6 for the floor board 5 is made of a member that is rotatably supported in a flexible, cylindrical outer member, such as a Bowden cable. Its tip portion is disposed in a first transmission box 61 as shown in FIG. 9. The first transmission box 61 accommodates, as shown in FIGS. 10A, 10B, a worm gear 62 that rotates along with the tip portion of the drive cable 48 coupled thereto and a worm wheel 63 that is driven by the worm gear 62. The worm wheel 63 has an engagement hole, into which a spline shaft 65 is inserted for engagement. The spline shaft 65 is provided so as to project from a second transmission box 64 that is provided below the first transmission box 61. The rotational force of the drive cable 48 is transmitted to the worm wheel 63 via the worm gear 62, so that the worm wheel 63 can be driven and this driven rotational force can be transmitted to the second transmission box 64 via the spline shaft 65.

The second transmission box 64 accommodates a first bevel gear 66 that rotates along with the spline shaft 65 and a second bevel gear 67 that is driven by the first bevel gear 66. The second bevel gear 67 is fixed to tip portions of the drive cables 33, so that the rotational force of the second bevel gear 67 can be transmitted to the drive cables 33 of the floor moving mechanism 6. Herein, between the drive cable 48 and the drive cables 33 of the floor moving mechanism 6 is provided a reduction mechanism with the above-described worm gear 62 and worm wheel 63. Thus, the transmitted rotational speed from the drive cable 48 of the slide drive portion 40 to the drive cables 33 of the floor moving mechanism 6 is reduced to a specified extent, one tenth, for example.

The second transmission box 64 is fixed to the vehicle floor 3 by attaching bolts that are disposed in front of the cross member 24 before the driver's seat 1, and the first and second transmission boxes 61, 64 are connected integrally with connecting bolts. Herein, the first transmission box 61 is operationally coupled to the second transmission box 64 with the engagement connection between the spline shaft 65 and the engagement hole of the worm wheel 63 in the first transmission box 61. When the seat cushion 35 is adjusted longitudinally along the seat rail 39 by moving the slider 44 by the slide drive portion 40, the drive force is transmitted to the drive cables 33 of the floor moving mechanism 6 via the drive cable 48 and the first and second transmission boxes 61, 64. Thereby, the drive cables 33 and the screw shafts 32 rotate and drive the slide blocks 34 so as to move longitudinally, so that the drive links 31 change the position from the lying state from the upright state, or from the upright state to the lying state. As a result, the rear side of the front-side board 15 can be moved upward or downward.

Figure 11:
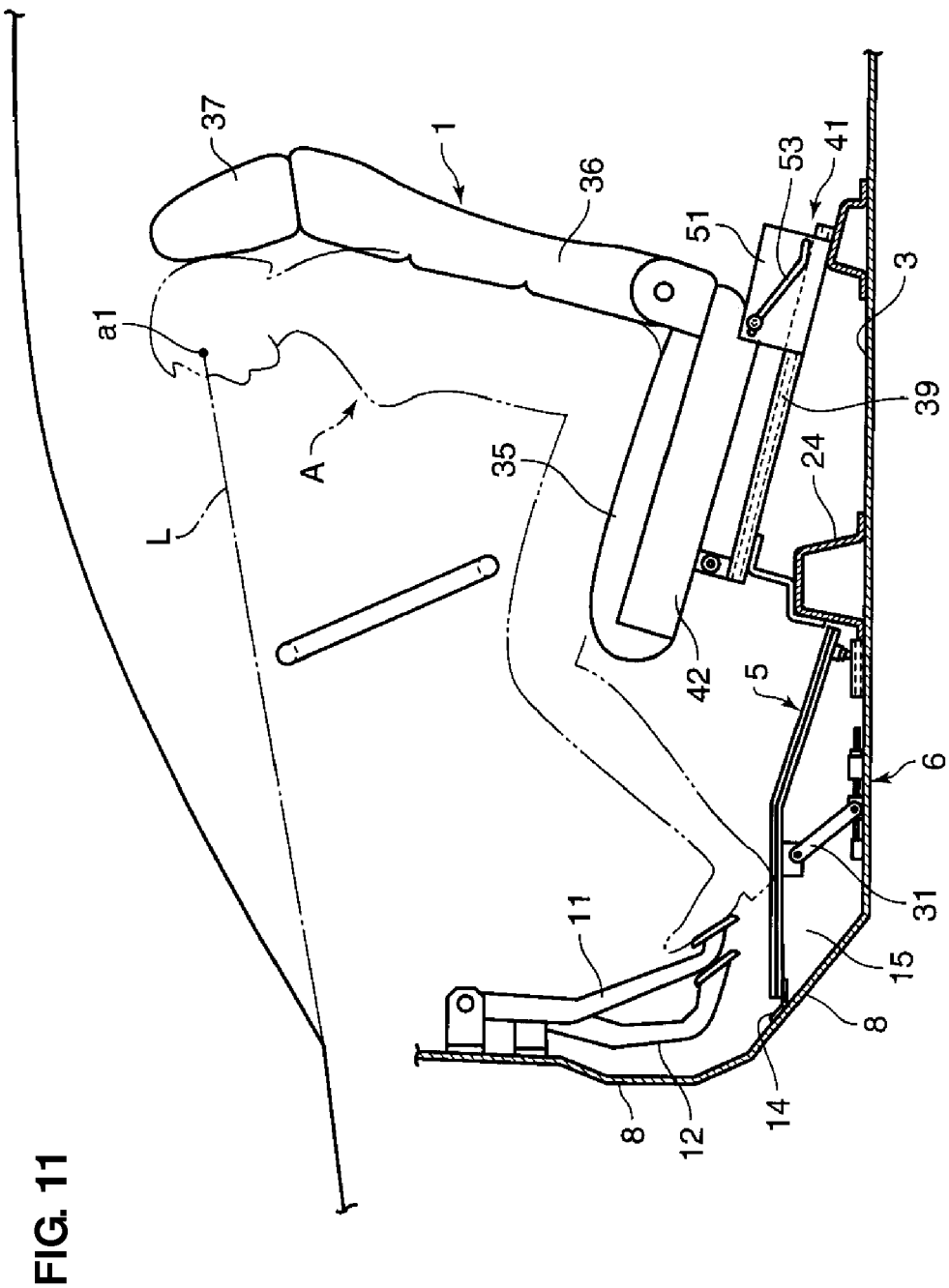
FIG. 11 is an explanatory diagram showing a state where a driver's seat is moved forward.

When the seat cushion 35 is moved by the slide drive portion 40 to slide forward from the rear position shown in FIGS. 1 and 7 to the front position shown in FIG. 11, the front portion of the seat cushion 35 goes up gradually along the seat rails 39, while the rear end portion of the seat cushion 35 is pushed upward by the guide pins 52 sliding forward along the guide grooves 53 of the guide plates 51. Thus, the position of the seat cushions 35 is changed so as to swing. As a result, as the seat cushion 35 is moved forward, the inclination angle of the seat cushion 35 relative to the horizontal face becomes gradually smaller and its sitting angle changes to the horizontal position finally. Also, the seat back 36 changes its position from the reclined state to the substantially upright state.

In a case where a relatively-short driver A is seated in the driver's seat 1, for example, the driver's seat 1 is moved forward by operating the drive motor of the slide drive portion 40 with the operation of an operation switch, not illustrated, and the seat cushion 35 changes the position in such a manner that its front portion goes upward along the seat rails 39 as shown in FIG. 11 and its rear portion is pushed upward, so that the inclination angle of the seat cushion 35 relative to the horizontal face becomes small. Accordingly, the upper body of the relatively-short driver A becomes in its upright state properly, so that an eye point at of the driver A can change forward and upward according to the height of the driver so as to be placed on the appropriate eye line L, which has an inclination angle of about 8 degrees relative to the horizontal face as illustrated. That is, the downward view range of the relatively-short driver A can correspond to the line L that extends from the eye point $a1$ downward, substantially passing at a lower end portion of a windshield along a hood's upper face. At the same time, a ball of a great toe (an appropriate position) of the foot's sole of the driver A can be located properly at an operational point 11*b* of the operational pedal, such as the accelerator pedal 11. Thus, the position of the seat cushion 35 that should be suitable for the relatively-short driver A can be provided.

Meanwhile, in a case where a relatively-tall driver C is seated in the driver's seat 1, the driver's seat 1 is moved to a rearmost position by operating the drive motor of the slide drive portion 40, and the seat cushion 35 changes the position in such a manner that its front portion goes down along the seat rails 39 as shown in FIG. 1 and its rear portion is pushed down, so that the inclination angle of the seat cushion 35 relative to the horizontal face becomes great. Accordingly, an eye point c1 of the driver C can be placed on the appropriate eye line L for the driver C, and the ball of the great toe of the foot's sole of the driver C can be located properly at the operational point 11b of the operational pedal, such as the accelerator pedal 11. Thus, the position of the seat cushion 35 that should be suitable for the relatively-tall driver C can be provided.

Figure 12:
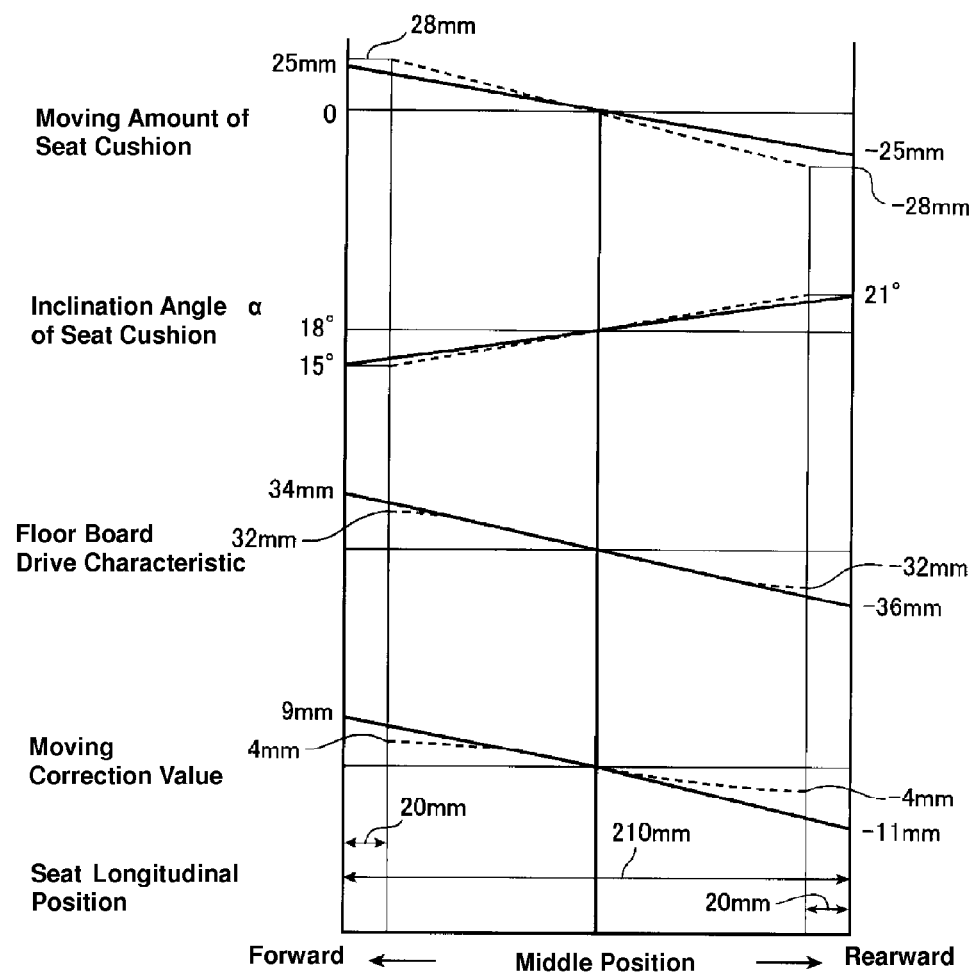
FIG. 12 is a graph showing drive characteristic and the like of the floor board.

FIG. 12 is a graph showing drive characteristic of the seat cushion 35 and drive characteristic of the floor board 5 in accordance with the longitudinal movement of the driver's seat 1. Solid lines in FIG. 12 show drive characteristic (first drive characteristic) for maintaining the sitting position of the driver sitting in the driver' seat 1, and broken lines in FIG. 12 show drive characteristic (second drive characteristic) for maintaining the sitting position of the driver sitting in the driver' seat 1.

Figure 13:
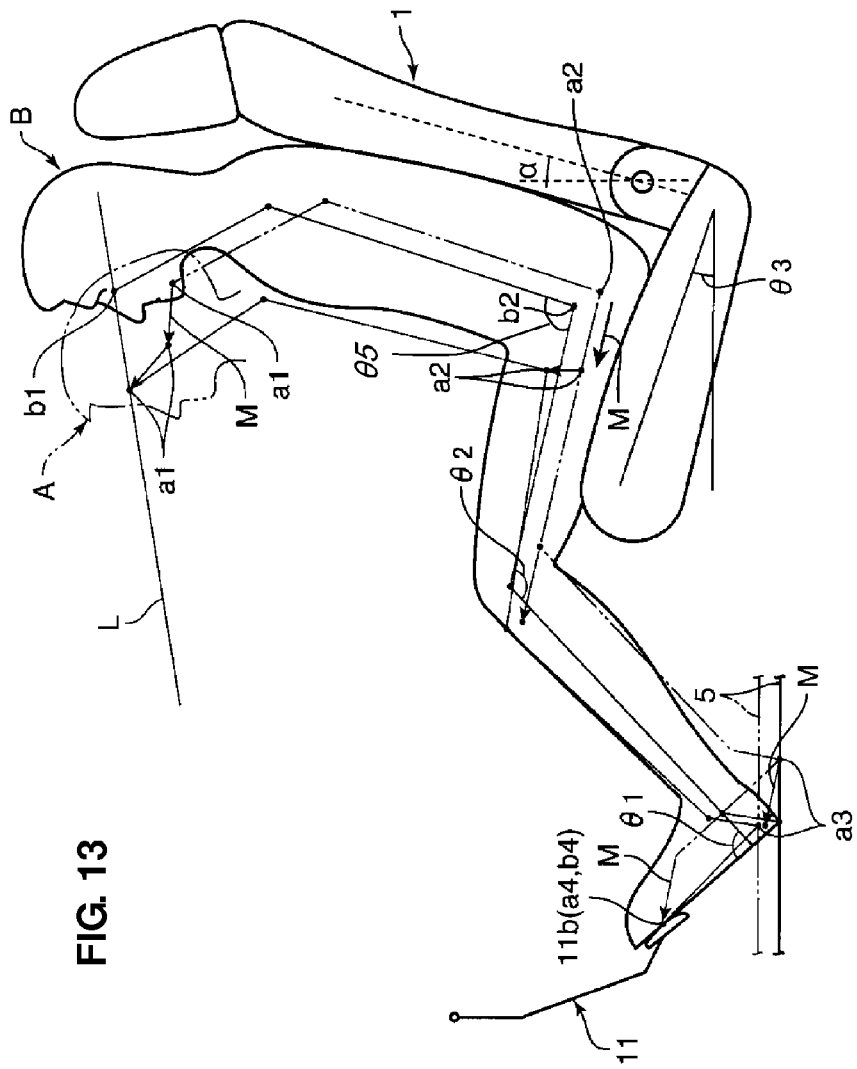
FIG. 13 is an explanatory diagram showing a state where a relatively-middle-height driver or the like is seated in the driver's seat.

In the seat-position adjusting mechanism 2, in which an eye point b1 of a relatively-middle-height driver B can be placed on the appropriate eye line L for the driver B by moving the seat cushion 35 to the middle position within the adjustable longitudinal range, which is 210 mm as shown by the solid lines in FIG. 12, of the seat cushion 35 that should be suitable for the relatively-middle-height driver B, who is 168 cm tall, average height, shown in FIG. 13, the adjustment of the driver's seat 1 based on the first drive characteristic will be described first.

The drive characteristic is configured such that the relatively-short driver A, who is about 150 cm, is seated in the same position (appropriate position) as the above-described relatively-middle-height driver B (see a position illustrated by a broken line in FIG. 13), the seat cushion 35 is moved forward by about 105 mm from the middle position, and the seat cushion 35 is moved upward by about 25 mm accordingly. Thereby, the eye point a1, a hip point a2, and a heel point a3 of the relatively-short driver A seated on the seat cushion 35 in the appropriate position are moved in parallel with the upward movement of 25 mm as shown by an arrow M in FIG. 13, and the ball of the great toe a4 of the sole of the driver A is located at the operational point 11b of the accelerator pedal 11 or the like.

Herein, the appropriate position of the driver seated in the driver's seat 1 means the sitting position that can maintain the comfortable state of the driver for a long period of time and provide the proper pedal operation. Specifically, this appropriate position is, for example, such that there can be provided an ankle angle θ1 of about 90 degrees, a knee angle θ2 of about 125 degrees, and a bending angle (θ5) between the upper body and the thigh portion of about 95 degrees, and a proper thigh angle (θ3) between the thigh portion and the horizontal face is obtained by adding 1.5 degrees to the inclination angle α of the seat cushion 35, which is known from the human engineering experimentation. Further, a moving line of the ball of the great toe a4 of the sole of the driver in accordance with the longitudinal and vertical movement of the seat cushion 35 may be obtained from calculations, simulations or the like, based on angles between some body portions, length of the thigh potion and the leg portion below knee, and the like for respective drivers in the appropriate positions.

That is, by setting the moving characteristic of the seat cushion 35 in the embodiment shown in FIG. 13 in such a manner that the seat cushion 35 goes upward by about 25 mm as it is moved forward by about 105 mm from the middle position, the respective balls of the great toe a4, b4 of the soles of the relatively-short driver A and relatively-middle-height driver B can be located at the operational point 11b of the accelerator pedal 11 or the like, maintaining the proper sitting positions of the drivers A, B.

Herein, the going-up amount of the seat cushion 35 (25 mm) is smaller than an average of difference in the eye point between the relatively-middle-height driver B and the relatively-short driver A, i.e., the difference average in vertical distance between the eye points a1 and b1 (about 90 mm). Accordingly, unless the upper body of the driver is rotated by changing the setting angle of the seat cushion 35, i.e., the inclination angle α of the seat cushion 35 relative to the horizontal line, the eye point a1 of the relatively-short driver A is positioned below the appropriate eye line L as shown in FIG. 13 even if the appropriate eye point may be lowered by about 20 mm due to the forward movement of the eye point a1 of the relatively-short driver A and the inclination of the appropriate eye line L. Herein, the above-described lowering amount (about 20 mm) of the appropriate eye point may be generally obtained by multiplying tan 8° (=0.1405) by the amount of value (145 mm), which is the total amount of the forward-movement amount (105 mm) of the driver's seat 1 and the forward-movement amount (about 40 mm) of the eye point a1 that is generated due to the rotation of the upper body of the driver.

Accordingly, in accordance with the forward movement of the seat cushion 35 of 105 mm from the middle position, by moving up the rear end portion of the seat cushion 35 with the tilt drive mechanism 41 of the seat-position adjusting mechanism 2, changing the inclination angle (thigh angle+1.5°) α of the seat cushion 35 from 18 degrees to 15 degrees, for example, and moving the position of the relatively-short driver A so that the upper body of the driver A is rotated around a rotational support point 11a or the operational point 11b of the operational pedal, such as the accelerator pedal 11, toward its rising direction, the eye point a1 of the relatively-short driver A is properly moved upward so as to be placed on the above-described appropriate eye line L, without changing the pressing point of the driver's sole relative to the operational pedal.

Figure 17:
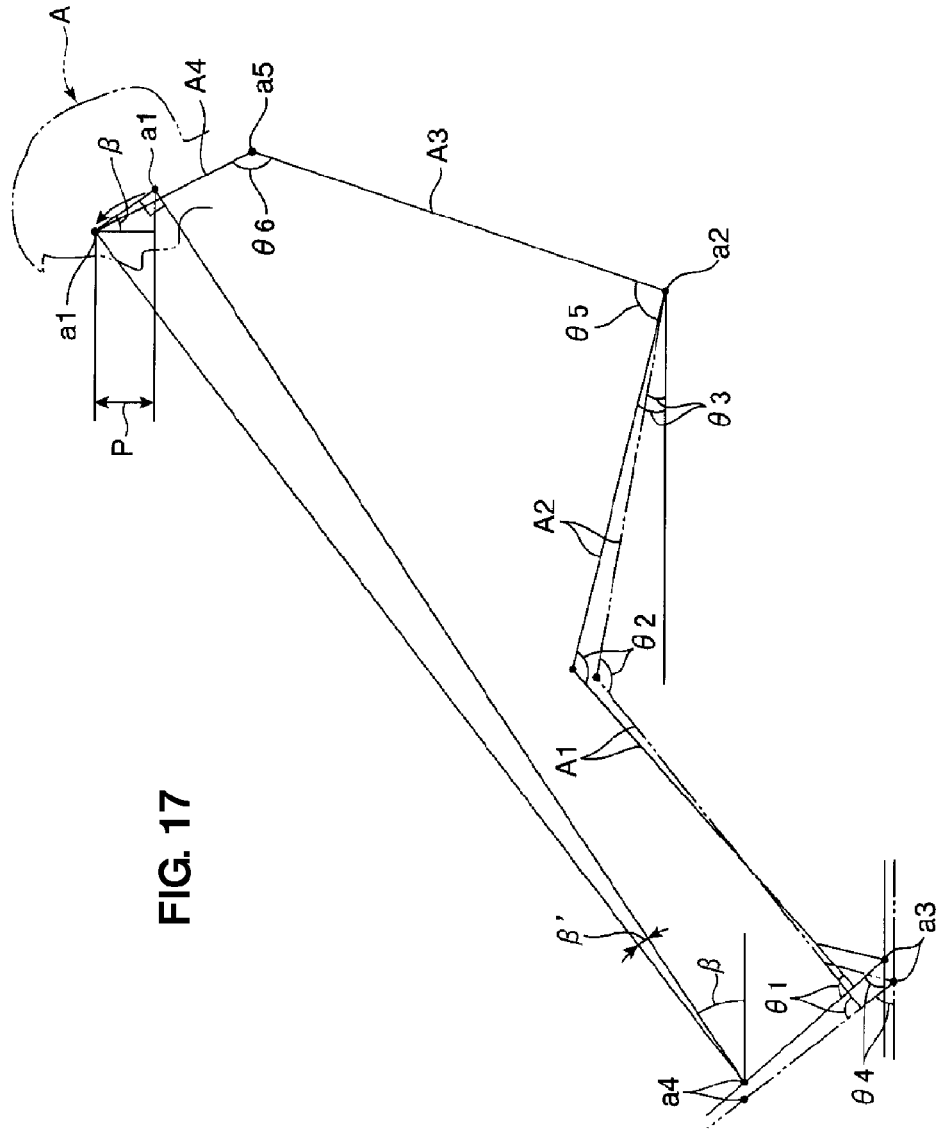
FIG. 17 is an explanatory diagram showing a sitting state of a relatively-short driver.

The upward-movement amount P of the eye point a1 due to the rotation of the upper body of the relatively-short driver A is obtained by multiplying sin β'·cos β by the distance between the ball of the great toe a4 of the sole of the driver A contacting the operational point 11b of the accelerator pedal 11 and the eye point a1 (about 1040 mm in the example shown in FIG. 17). Herein, the above β means the inclination angle (about 34°) of a line interconnecting the ball of the great toe a4 and the eye point a1 relative to the horizontal line, and the above β' means an angle (3°) that is the angle change of the seat cushion 35 that corresponds to the changing amount of the above inclination angle β due to the rotation of the upper body of the driver A.

According to the specific calculation, the upward-movement amount of the eye point a1 due to the rotation of the upper body of the relatively-short driver A is about 45 mm. The total amount of this amount, the lowering amount (about 20 mm) of the eye point a1 due to the forward movement of the driver's seat 1 and the inclination of the appropriate line L, and the upward-movement amount P of the eye point a1 obtained by addition of the going-up amount of the seat cushion 35 (25 mm) is the value (about 90 mm) that substantially corresponds to the average difference value in eye point between the relatively-middle-height driver B and the relatively-short driver A. Thus, by moving upward the seat cushion 35 and rotating the upper body of the relatively-short driver A in accordance with the forward movement of the driver's seat 1 as described, the eye point a1 of the relatively-short driver A can be placed on the appropriate eye line L, maintaining the ball of the great toe a4 of the sole of the driver A contacting the operational point 11b of the accelerator pedal 11.

The above-described calculation of the upward-movement amount P of the eye point a1 of the relatively-short driver A was conducted based on presumption in that the driver is seated in a state, as shown in FIG. 17, where the length of the leg portion below knee A1 is 41 cm, the length of the thigh portion A2 is 38 cm, the length of upper body A3 between the hip point a2 and the shoulder portion a5 is 42 cm, the length of neck A4 between the shoulder portion a5 and the eye point a1 is 17 cm, the ankle angle $\theta 1$ is 90 degrees, the knee angle $\theta 2$ of the bending angle between the leg portion below knee A1 and the thigh portion A2 is 125 degrees, the thigh angle $\theta 3$ is 16.5 degrees, the bending angle $\theta 5$ between the upper body A3 and the thigh portion A2 is 95 degrees, and the bending angle $\theta 6$ between the upper body A3, and the neck portion A4 is 135 degrees.

Herein, the seat cushion 35 swings around the pivotal axis 46 provided forward and below it, and the upper body of the relatively-short driver A rotates around the pivotal axis 46 as well. Accordingly, the upper body of the driver A may not rotate around the support point of the operational point 11b of the operational pedal only with the swing movement of the seat cushion 35, so in order to rotate the upper body of the driver A around the operational point 11b of the operational pedal, the seat cushion 35 needs to be moved forward and upward along the seat rail 39 along with the swing movement of the seat cushion 35. Thereby, the forward-movement distance of the seat cushion 35 becomes greater than the above-described value (105 mm) finally.

Figure 14:
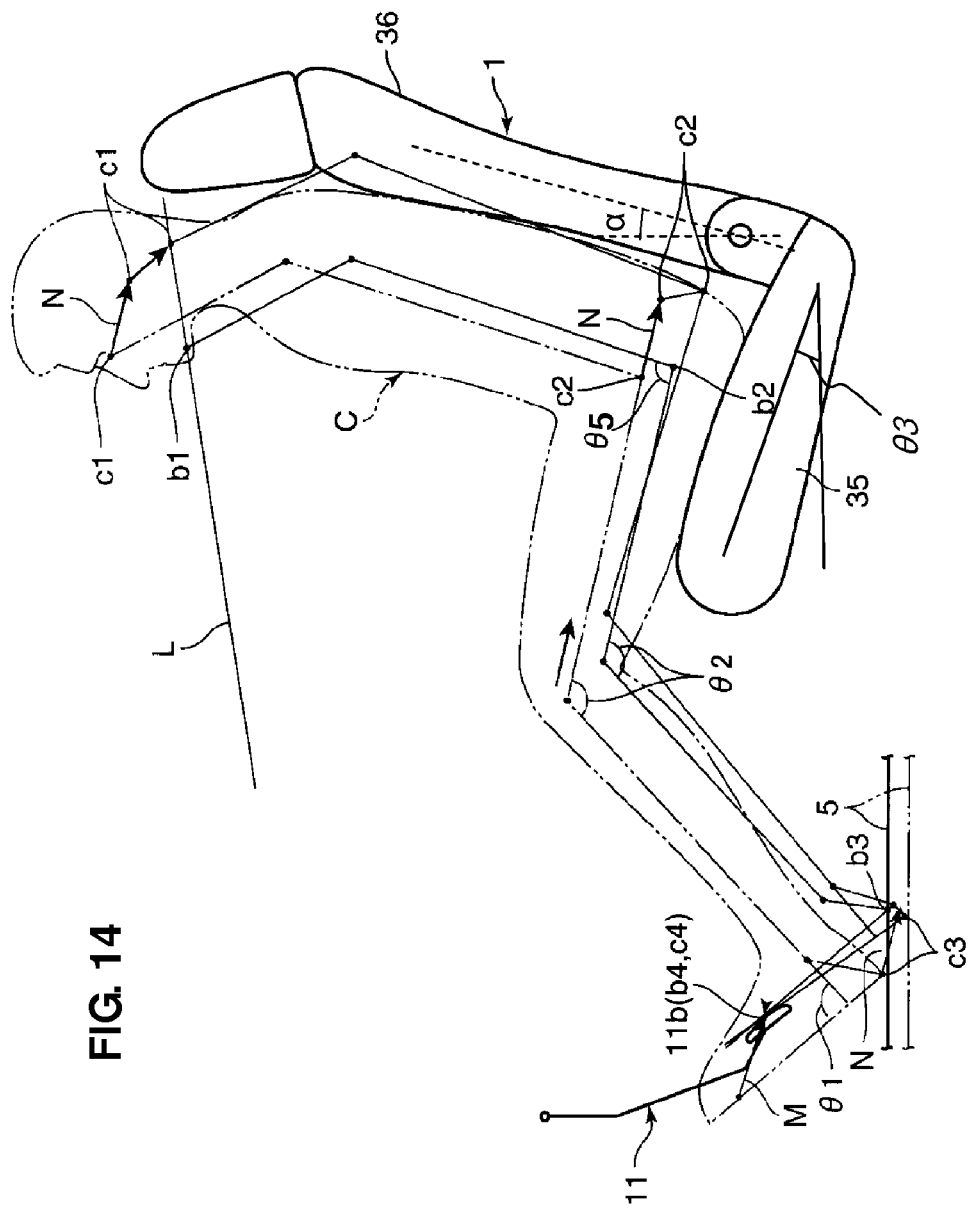
FIG. 14 is an explanatory diagram showing a state where a relatively-tall driver or the like is seated in the driver's seat.

Meanwhile, the drive characteristic can be configured such that the relatively-tall driver C, who is about 188 cm, is seated in the appropriate position as shown by a broken line in FIG. 14, the seat cushion 35 is moved rearward by about 105 mm from the middle position, and the seat cushion 35 is moved downward by about 25 mm accordingly. Thereby, the eye point c1, a hip point c2, and a heel point c3 of the relatively-tall driver C seated on the seat cushion 35 in the appropriate position are moved in parallel with the downward movement of 25 mm as shown by an arrow N in FIG. 14, and the ball of the great toe c4 of the sole of the driver C can be located at the operational point 11b of the accelerator pedal 11 or the like.

Herein, the going-down amount (25 mm) of the seat cushion 35, eye point c1, and hip point c2 is smaller than an average of difference in the eye point between the relatively-middle-height driver B and the relatively-tall driver C (about 100 mm). Accordingly, unless the inclination angle of the seat cushion 35 is changed, the eye point c1 of the relatively-tall driver C is positioned above the appropriate eye line L even if the appropriate eye point may go upward by about 20 mm due to the rearward movement of the eye point c1 of the relatively-tall driver C and the inclination of the appropriate eye line L.

Accordingly, in accordance with the rearward movement of the seat cushion 35 of 105 mm from the middle position, by moving down the rear end portion of the seat cushion 35 with the tilt drive mechanism 41, changing the inclination angle $\alpha$ of the seat cushion 35 from 18 degrees to 21 degrees, for example, and moving the position of the relatively-tall driver C so that the upper body of the driver C is rotated around the operational point 11c of the operational pedal, such as the accelerator pedal 11, toward its rising direction, the eye point c1 of the relatively-tall driver C is properly moved downward so as to be placed on the appropriate eye line L.

The downward-movement amount of the eye point c1 due to the rotation of the upper body of the relatively-tall driver C is obtained by multiplying $\tan \beta' \cdot \cos \beta$ by the distance between the ball of the great toe c4 of the sole of the driver C contacting the operational point 11b of the accelerator pedal 11 and the eye point c1. Herein, the above $\beta$ means the inclination angle of about 34 degrees of a line interconnecting the ball of the great toe c4 and the eye point c1 relative to the horizontal line, and the above $\beta'$ means an angle of 3 degrees that is the angle change of the seat cushion 35 that corresponds to the changing amount of the above inclination angle $\beta$ due to the rotation of the upper body of the driver C.

According to the specific calculation based on assumption that respective parts of the body of the relatively-tall driver C and the relatively-short driver A are changeable in proportion to their heights (see FIG. 18), the distance between the ball of the great toe c4 of the sole and the eye point c1 is about 1300 mm, the downward-movement amount Q of the eye point c1 due to the rotation of the upper body of the relatively-tall driver C is about 56 mm. The total amount (about 101 mm) of this amount, the lowering amount (about 20 mm) of the eye point due to the forward movement of the driver's seat 1 and the inclination of the appropriate line L, and the downward-movement amount Q of the eye point c1 obtained by addition of the going-up amount of the seat cushion 35 (25 mm) substantially corresponds to the average difference value (about 100 mm) in eye point between the relatively-middle-height driver B and the relatively-tall driver C. Thus, by moving downward the seat cushion 35 and rotating the upper body of the relatively-tall driver C in accordance with the rearward movement of the driver's seat 1 as described, the eye point c1 of the relatively-tall driver C can be placed on the appropriate eye line L, maintaining the ball of the great toe c4 of the sole of the driver C contacting the operational point 11b of the accelerator pedal 11. Herein, in order to rotate the upper body of the relatively-tall driver C around the operational point 11b of the operational pedal, likewise, the seat cushion 35 needs to be moved rearward and downward along the seat rail 39 with the swing movement of the seat cushion 35.

Further, when the relatively-short driver A is seated in the driver's seat 1, and the driver's seat 1 is moved forward with the seat-position adjusting mechanism 2, and the position of the drive links 31 of the floor moving mechanism 6 are changed from the lying state to the upright state, the floor board 5 is driven to its up position shown in FIGS. 4 and 11. The movement of the floor board 5 with the floor moving mechanism 6, specifically the movement of a specified portion of the floor board 5 where the heel portion of the driver may be placed, which is about 250 mm rearward away from the rotational support point 11a of the operational pedal, is conducted based on the drive characteristic that is set by the going-up amount of the seat cushion 35 in accordance with the forward movement of the driver's seat 1 and a moving correction value in accordance with changing of the inclination angle $\alpha$ as shown in FIG. 12.

Figure 15:
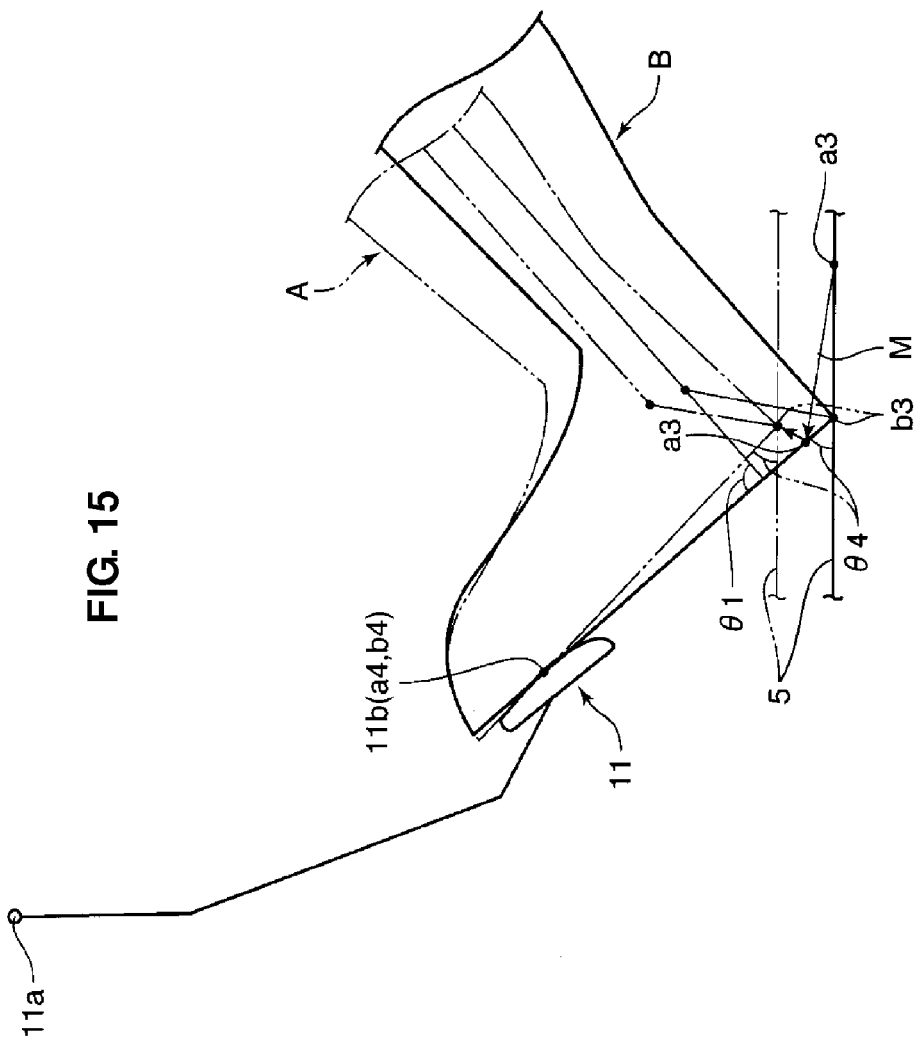
FIG. 15 is an explanatory diagram showing an upward-movement amount of the floor board.

That is, according to the driving position adjusting device shown in FIG. 13 in which when the driver seated in the driver's seat 1 changes from the relatively-middle-height driver B to the relatively-short driver A, the seat cushion 35 is moved forward by about 105 mm from the middle position, the seat cushion 35 is moved upward by about 25 mm, and the inclination angle $\alpha$ of the seat cushion 35 is changed from 18 degrees to 15 degrees accordingly, the heel point a3 of the relatively-short driver A is moved in parallel along with the seat cushion 35 as shown by an arrow M in FIG. 15.

Further, when the inclination angle α of the seat cushion 35 is changed from 18 degrees to 15 degrees and the thigh angle θ3 is changed from 16.5 degrees to 13.5 degrees, an inclination angle θ4 of the sole of the relatively-short driver A relative to the horizontal line changes from 51.5 degrees to 48.5 degrees, and the heel portion a3 of the relatively-short driver A goes up further. Accordingly, the upward-movement amount of the heel portion a3 can be obtained based on the drive characteristic that is obtained through of an addition of the going-up amount of the seat cushion 35 and a moving correction value in accordance with changing of the inclination angle α of the seat cushion 35.

The upward-movement amount (moving correction value) of the heel portion a3 in accordance with the change of the sole's inclination angle θ4 is obtained by multiplying sin (θ4')·cos (θ4) by a pressing height of the accelerator pedal, i.e., the distance between the heel portion a3 and the ball of the great toe a4 contacting the operational point 11b of the accelerator pedal 11. Herein, the above θ4' means the change amount of the sole's inclination angle θ4 in accordance with the change of the inclination angle α of the seat cushion 35. In the embodiment shown in FIG. 13 with the sole's inclination angle θ4 of 51.5 degrees, for example, if it is assumed that the sole size of the relatively-short driver A is 230 mm and the distance between the tip of the toe and the ball of the great toe a4 is 45 mm, the pressing height of the accelerator pedal 11 by the relatively-short driver A will be about 185 mm. Thus, the moving correction value for the relatively-short driver A will be 9 mm because of the change of the sole's inclination angle θ4 of 3 degrees.

For example, as shown in FIG. 13, although the heel portion a3 prior to the forward movement of the seat cushion 35 of the driver's seat 1 with the relatively-short driver A from the middle position is located slightly below the heel portion b3 of the relatively-middle-height driver B, if this amount is extremely small, then both heel portions a3, b3 may be assumed to have the same height. In this case, the drive characteristic for showing the moving amount of the floor board 5 by the floor moving mechanism 6 can be set based on the going-up amount of the seat cushion 35 in accordance with its forward movement of 105 mm from the middle position and the moving correction value in accordance with changing of the inclination angle α of the seat cushion 35 from 18 degrees to 15 degrees. Thus, by adjusting the floor board 5 with the floor moving mechanism 6 based on this drive characteristic, the best position (the balls of the great toe b4, c4) of the sole can be located at the operational point 11b of the operational pedal, such as the accelerator pedal 11, surely regardless of the size of the driver in the driver's seat 1, keeping the heel portions a3, b3 on the floor board 5, thereby providing the proper operational function of the operational pedal.

Herein, in a case where the heel portion a3 prior to the forward movement of the seat cushion 35 of the driver's seat 1 with the relatively-short driver A from the middle position is located substantially at the same level as the heel portion b3 of the relatively-middle-height driver B, since the upward-movement amount of the floor board 5 becomes the total of its upward-movement amount in accordance with the forward movement of the seat cushion 35 and the above-described moving correction value, it is always greater than its upward-movement amount in accordance with the forward movement of the seat cushion 35. Accordingly, the drive characteristic of the floor board 5 is set so that the vertical distance between the seat cushion 35 and the floor board 5 decreases in accordance with the forward movement of the driver's seat 1. In other words, the above-described moving correction value means the amount of change in the vertical distance between the seat cushion 35 and the floor board 5 in accordance with the forward movement of the driver's seat, and it is set to change linearly in accordance with the forward movement of the driver's seat 1.

Figure 16:
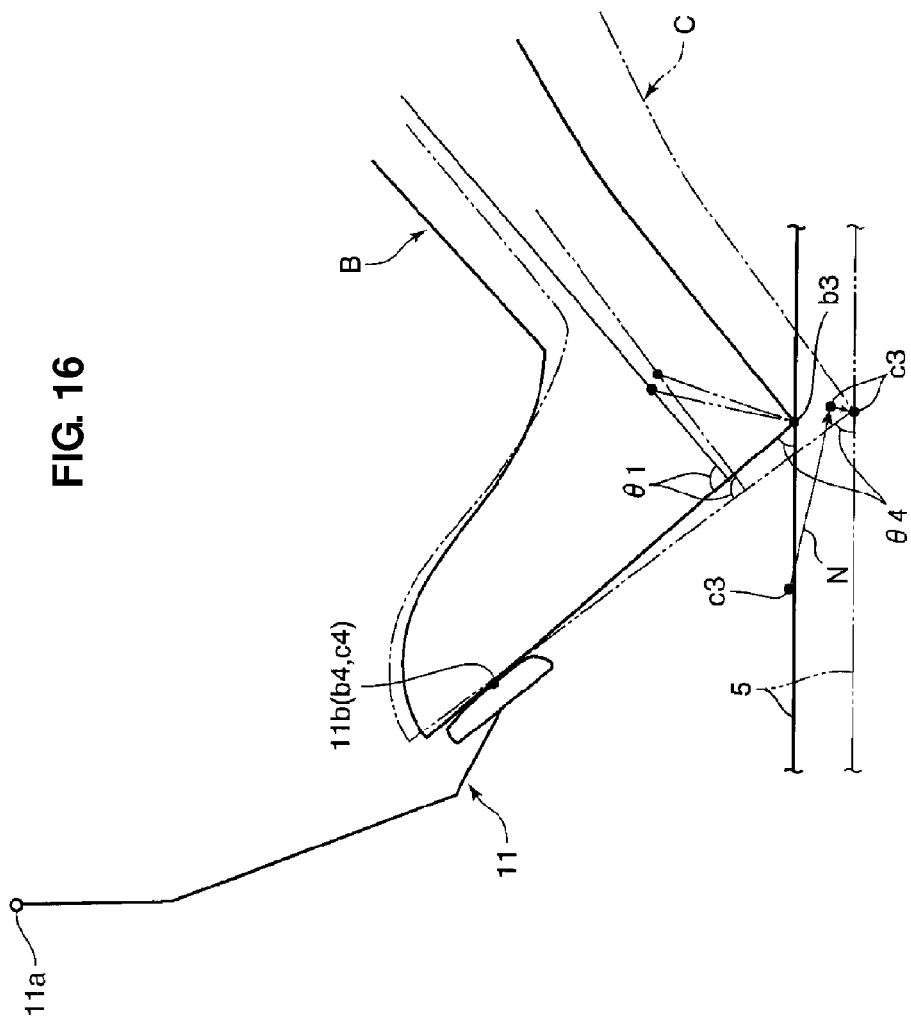
FIG. 16 is an explanatory diagram showing an downward-movement amount of the floor board.

Meanwhile, in a case where the driver's seat 1 is moved rearward by about 105 mm in accordance with the driver change to the relatively-tall driver C from the relatively-middle-height driver B as shown in FIG. 14, the heel portion c3 of the relatively-tall driver C is moved downward and rearward in parallel to the upward and forward movement of the seat cushion 35 as shown by an arrow N of FIG. 16. And, also the sole's inclination angle θ4 of the relatively-tall driver C relative to the horizontal line is changed from 51.5 degrees to 54.5 degrees as the inclination angle α of the seat cushion 35 is changed from 18 degrees to 21 degrees, for example. Further, the heel portion c3 of the relatively-tall driver C goes down further in accordance with this change of the sole's inclination angle θ4. Accordingly, the downward-movement amount of the heel portion c3 can be obtained based on the going-down amount of the heel portion c3 that corresponds to the downward movement of the seat cushion 35 and the moving correction value in accordance with changing of the inclination angle α of the seat cushion 35.

The downward-movement amount (moving correction value) of the heel portion c3 in accordance with the change of the sole's inclination angle θ4 is obtained by multiplying sin (θ4')·cos (θ4) by a pressing height of the accelerator pedal 11, i.e., the distance between the heel portion c3 and the ball of the great toe c4 contacting the operational point 11b of the accelerator pedal 11. In the embodiment shown in FIG. 16 with the sole's inclination angle θ4 of 51.5 degrees, for example, if it is assumed that the sole size of the relatively-tall driver C is 290 mm and the distance between the tip of the toe and the ball of the great toe c4 is 55 mm, the pressing height of the accelerator pedal 11 by the relatively-tall driver C will be about 235 mm. Thus, the moving correction value for the relatively-tall driver C will be −11 mm because of the change amount θ4' of the sole's inclination angle θ4 of 3 degrees.

For example, as shown in FIG. 14, in a case where the heel portion c3 prior to the movement of the seat cushion 35 of the driver's seat 1 with the relatively-tall driver C from the middle position is located substantially at the same level as the heel portion b3 of the relatively-middle-height driver B, the drive characteristic of the floor board 5 can be obtained by adding the going-down amount of the seat cushion 35 in accordance with its rearward movement of 105 mm from the middle position, the moving correction value corresponding to the inclination angle θ4 of the sole that changes in accordance with changing of the inclination angle α of the seat cushion 35 from 18 degrees to 21 degrees, and the difference between the heel portions b3 and c4. Thus, by adjusting the floor board 5 with the floor moving mechanism 6 based on this drive characteristic, the best position (the balls of the great toe b4, c4) of the sole can be located at the operational point 11b of the operational pedal, such as the accelerator pedal 11, surely regardless of the size of the driver in the driver's seat 1, keeping the heel portions b3, c3 on the floor board 5, thereby providing the proper operational function of the operational pedal.

Herein, in a case where the level deference between the heel portion c3 prior to the movement of the seat cushion 35 of the driver's seat 1 with the relatively-tall driver C from the middle position and the heel portion b3 of the relatively-middle-height driver B and thus both are located substantially at the same level position, the downward-movement amount of the floor board 5 becomes the total of the downward-movement amount of the floor board 5 in accordance with the rearward movement of the seat cushion 35 and the above-described moving correction value. Accordingly, the downward-movement amount of the floor board 5 is always greater than its downward-movement amount in accordance with the rearward movement of the seat cushion 35. Accordingly, the drive characteristic of the floor board 5 is set so that the vertical distance between the seat cushion 35 and the floor board 5 increases in accordance with the rearward movement of the driver's seat 1. The above-described moving correction value means the amount of change in the vertical distance between the seat cushion 35 and the floor board 5 in accordance with the rearward movement of the driver's seat 1, and it is set to change linearly in accordance with the rearward movement of the driver's seat 1.

According to the driving position adjusting device described above, which comprises the seat-position adjusting mechanism 2 to adjust the longitudinal position, the height and the seat-face angle of the seat cushion 35 of the driver's seat 1, the longitudinal position of the seat cushion 35 adjusted by the seat-position adjusting mechanism 2 being configured to changeable within the adjustable longitudinal range of the driver's seat 1, and the floor moving mechanism 6 to adjust the height of the floor board 5 that is provided for the foot portion of the driver, the seat-position adjusting mechanism 2 is configured so that the inclination angle α of the seat cushion 35 relative to the horizontal face can become smaller as the seat cushion 35 of the driver's seat 1 is moved forward from the middle position in the adjustable longitudinal range, and the floor moving mechanism 6 is configured so that the height of the floor board 5 can become higher as the seat cushion 35 of the driver's seat 1 is moved forward from the middle position based on the drive characteristic (first drive characteristic), which is set by the going-up amount of the seat cushion 35 in accordance with the forward movement of the driver's seat 1 and the moving correction value in accordance with changing of the inclination angle α of the seat cushion 35. Thereby, the sitting position and the operational function of the operational pedal can be provided properly.

That is, in a case where the relatively-short driver A sits in the driver's seat 1, the driver's seat 1 is moved forward from the middle position in the adjustable longitudinal range, and the seat cushion 35 is moved upward and the angle of the seat face is changed in a direction that its inclination angle α of the seat cushion 35 relative to the horizontal face becomes smaller, so that the position of the hip point a2 indicating the sitting center of the driver on the seat cushion 35 can be moved forward and upward suitably for the relatively-short driver A and the upper body of the relatively-short driver A can be positioned in relatively upright state. Accordingly, the sitting position can be provided properly and the driver's eye point a1 can be placed on the appropriate eye line L, without making the longitudinal movement distance of the seat cushion 35 considerably long.

Further, the floor moving mechanism 6 is configured so that the height of the floor board 5 can become higher as the seat cushion 35 of the driver's seat 1 is moved forward from the middle position based on the drive characteristic (first drive characteristic), which is set by the going-up amount of the seat cushion 35 in accordance with the forward movement of the driver's seat 1 and the moving correction value in accordance with changing of the inclination angle α of the seat cushion 35 when the driver is changed from the relatively-middle-height driver B to the relatively-short driver A. Thereby, the appropriate positions of the foot's sole of the drivers (the respective balls of the great toe a4, b4) can be located at the operational point 11b of the operational pedal such as the accelerator pedal 11 surely regardless of the size of the driver, thereby providing the proper operational function of the operational pedal.

Also, by adjusting the longitudinal position of the seat cushion 35 with the seat-position adjusting mechanism 2, adjusting the height and the sitting-face angle of the seat cushion 35 in accordance with the longitudinal movement of the driver's seat 1, and moving the floor board 5 based on the drive characteristic (first drive characteristic), the above-described eye-point height adjustment and the moving adjustment of the floor board 5 can be attained properly even for any driver who has a body size that is smaller than the relatively-middle-height driver B and larger than the relatively-short driver A. Thus, the sitting position and the operational function of the operational pedal can be provided properly, and the driver's eye point can be placed on the appropriate eye line L as well.

Further, in the above-described driving position adjusting device, in a case where the relatively-tall driver C sits in the driver's seat 1, the driver's seat 1 is moved rearward from the middle position in the adjustable longitudinal range, and the seat cushion 35 is moved downward and the angle of the seat face is changed in a direction that its inclination angle α of the seat cushion 35 relative to the horizontal face becomes greater, so that the position of the hip point c2 indicating the sitting center of the driver on the seat cushion 35 can be moved rearward and downward suitably for the relatively-tall driver C and the upper body of the relatively-tall driver C can be positioned in relatively reclined state. Accordingly, the sitting position can be provided properly and the driver's eye point c1 can be placed on the appropriate eye line L, without making the longitudinal movement distance of the seat cushion 35 considerably long.

Further, the floor moving mechanism 6 is configured so that the height of the floor board 5 can become lower as the seat cushion 35 of the driver's seat 1 is moved rearward from the middle position based on the drive characteristic (first drive characteristic), which is set by the going-down amount of the seat cushion 35 in accordance with the rearward movement of the driver's seat 1 and the moving correction value in accordance with changing of the inclination angle α of the seat cushion 35 when the driver is changed from the relatively-middle-height driver B to the relatively-tall driver C. Thereby, the appropriate positions of the foot's sole of the drivers (the respective balls of the great toe c4, b4) can be located at the operational point 11b of the operational pedal such as the accelerator pedal 11 surely regardless of the size of the driver, thereby providing the proper operational function of the operational pedal.

Also, by adjusting the longitudinal position of the seat cushion 35 with the seat-position adjusting mechanism 2, adjusting the height and the sitting-face angle of the seat cushion 35 in accordance with the longitudinal movement of the driver's seat 1, and moving the floor board 5 based on the drive characteristic (first drive characteristic), the above-described eye-point height adjustment and the moving adjustment of the floor board 5 can be attained properly even for any driver who has a body size that is greater than the relatively-middle-height driver B and smaller than the relatively-tall driver C. Thus, the sitting position and the operational function of the operational pedal can be provided properly, and the driver's eye point can be placed on the appropriate eye line L as well.

Next, the adjustment operation of the driving position by the driving position adjusting device that comprises the seat-position adjusting mechanism 2 in which the adjustable longitudinal range of the seat cushion 35 of the driver's seat 1 is set to be 170 mm as shown by the broken lines in FIG. 12 will be described. According to the driving position adjusting device, since the forward or rearward adjustable longitudinal range of the seat cushion 35 is 20 mm shorter, respectively, compared to the first drive characteristic shown by the solid lines in FIG. 12. Thus, the change amount of the appropriate eye-pint height for the forward or rearward movement of the driver's seat 1 becomes smaller by 3 mm, respectively. In order to correct this, the moving amount of the seat cushion 35 in accordance with the longitudinal movement of the seat cushion 35 is increased, so that the maximum going-up amount and the maximum going-down amount of the seat cushion 35 are set to be 28 mm, respectively.

Further, since the upper body of the driver in the driver's seat 1 moves in the same manner as the case of the first drive characteristic shown by the solid lines in FIG. 12, a second drive characteristic is set so that the inclination angle $\alpha$ of the seat cushion 35 can move in the same manner. That is, the second drive characteristic is set so that in accordance with the forward movement of the seat cushion 35 of 85 mm from the middle position, the inclination angle $\alpha$ of the seat cushion 35 is changed from 18 degrees to 15 degrees, and so that in accordance with the rearward movement of the seat cushion 35 of 85 mm from the middle position, the inclination angle $\alpha$ of the seat cushion 35 is changed from 18 degrees to 21 degrees.

Meanwhile, the second drive characteristic of the floor board 5 is set so that the height of the floor board 5 becomes higher in accordance with the forward movement of the driver's seat 1 and the changing rate of this height of the floor board 5 decreases as the driver's seat 1 is moved forward from the middle position, and so that the height of the floor board 5 becomes lower in accordance with the rearward movement of the driver's seat 1 and the changing rate of this height of the floor board 5 decreases as the driver's seat 1 is moved rearward from the middle position.

FIG. 17 shows a state where the relatively-short driver A in the driver's seat 1 is moved to the foremost position. In the figure, the sitting position of the relatively-short driver A in a state where the inclination angle $\alpha$ of the seat cushion 35 is changed based on the first drive characteristic shown by the solid lines in FIG. 12 is shown by solid lines. Meanwhile, the sitting position of the relatively-short driver A in a state where the inclination angle $\alpha$ of the seat cushion 35 is changed based on the second drive characteristic shown by the broken lines in FIG. 12 is shown by imaginary lines.

In a case where the inclination angle $\alpha$ of the seat cushion 35 is changed based on the above-described first drive characteristic, the ankle angle $\theta_1$ becomes 90 degrees, the knee angle $\theta_2$ of the bending angle between the leg portion below knee A1 and the thigh portion A2 becomes 125 degrees, the bending angle $\theta_5$ between the upper body A3 and the thigh portion A2 becomes 95 degrees, and the proper thigh angle $\theta_3$ between the thigh portion A2 and the horizontal line becomes 13.5 degrees that is obtained by subtracting 1.5 degrees from the inclination angle $\alpha$ (15 degrees) of the seat cushion 35. Thereby, the position can be maintained in a comfortable state for a long-period sitting and for the proper operation of the pedal.

Meanwhile, in a case where the inclination angle $\alpha$ of the seat cushion 35 is changed based on the above-described second drive characteristic, the ankle angle $\theta_1$ and the angle of the upper body A3 are set to be the same as those of the first drive characteristic, but the knee angle $\theta_2$ changes from 125 degrees to 130 degrees and the thigh angle $\theta_3$ changes from 13.5 degrees to 10.5 degrees accordingly, which are differences from the first drive characteristic. This is because in the case of the second drive characteristic the ball of the great toe a4 is tried to be located at the operational point of the operational pedal by correcting the sitting position properly against the above-described 20 mm short distance of the adjustable longitudinal (forward) range of the driver's seat 1.

As described above, by changing the knee angle $\theta_2$ by 5 degrees and changing the thigh angle $\theta_3$ by 3 degrees, the inclination angle $\theta_4$ of the sole is changed from 48.5 degrees to 50.5 degrees and thereby the heel portion a4 lowers by about 5 mm (=185 mm×sin $\theta_4'$×cos $\theta_4$). This means that in order to locate the ball of the great toe a4 at the operational point of the operational pedal regardless of the above-described position change, it will be necessary to lower the height of the floor board 5 by about 5 mm compared to the first drive characteristic, namely, that the moving correction value at the foremost position of the driver's seat 1 will be about 4 mm. As a result, the drive characteristic for moving the floor board 5 that is obtained from the total of the going-up amount of the seat cushion 35 and its moving correction value is set in such a manner that the changing rate of the going-up floor board 5 gradually decreases as the driver's seat 1 is moved forward from the middle position.

Figure 18:
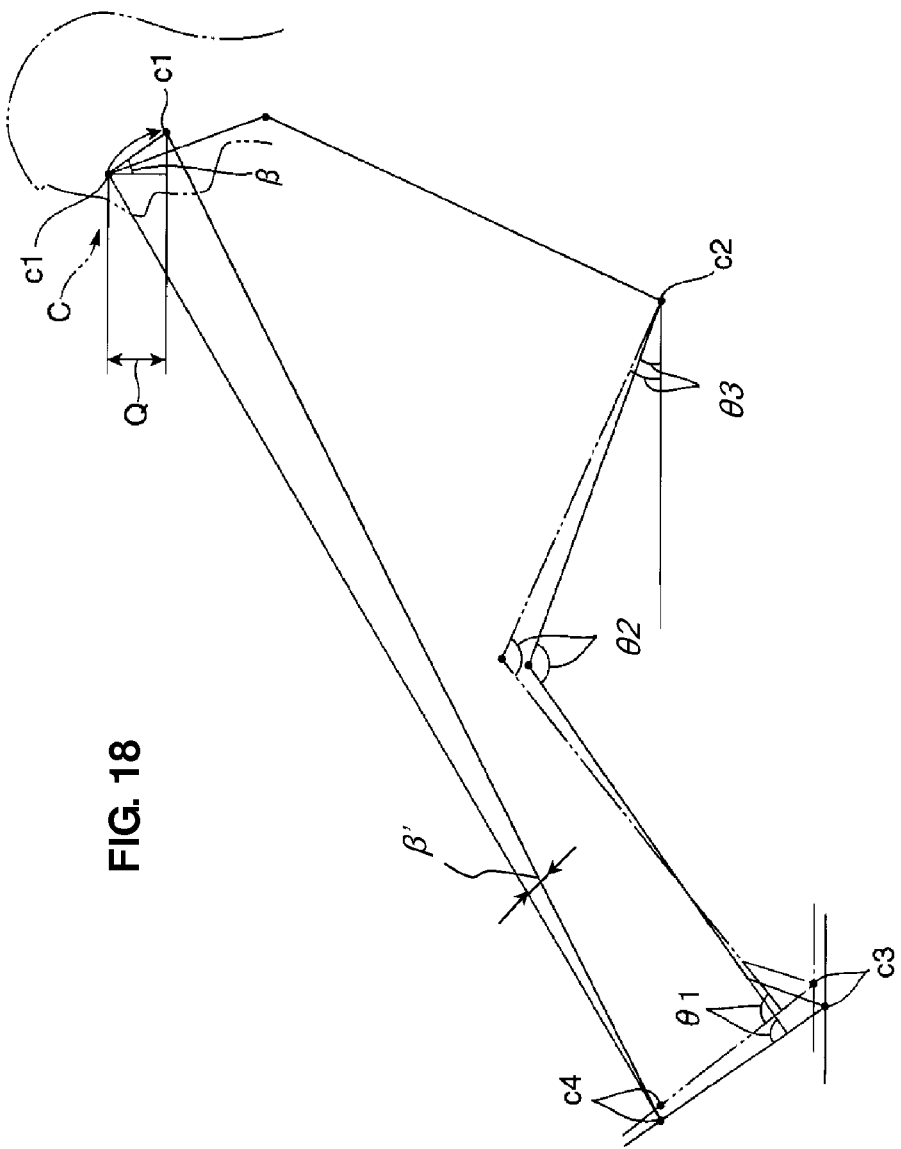
FIG. 18 is an explanatory diagram showing a sitting state of a relatively-tall driver.

FIG. 18 shows a state where the relatively-tall driver C in the driver's seat 1 is moved to the rearmost position. In the figure, the sitting position of the relatively-tall driver C in a state where the inclination angle $\alpha$ of the seat cushion 35 is changed based on the first drive characteristic shown by the solid lines in FIG. 12 is shown by solid lines. Meanwhile, the sitting position of the relatively-tall driver C in a state where the inclination angle $\alpha$ of the seat cushion 35 is changed based on the second drive characteristic shown by the broken lines in FIG. 12 is shown by imaginary lines.

In a case where the inclination angle $\alpha$ of the seat cushion 35 is changed based on the above-described second drive characteristic, the ankle angle $\theta_1$ and the angle of the upper body A3 are set to be the same as those of the above-described first drive characteristic, but the knee angle $\theta_2$ changes from 125 degrees to 118 degrees and the thigh angle $\theta_3$ changes from 19.5 degrees to 24.5 degrees accordingly, which are differences from the first drive characteristic. This is because in the case of the second drive characteristic the ball of the great toe c4 is tried to be located at the operational point of the operational pedal by correcting the sitting position properly against the above-described 20 mm short distance of the adjustable longitudinal (rearward) range of the driver's seat 1.

As described above, by changing the knee angle $\theta_2$ by 7 degrees and changing the thigh angle $\theta_3$ by 5 degrees, the inclination angle $\theta_4$ of the sole is changed from 54.5 degrees to 52.5 degrees and thereby the heel portion c4 rises by about 7 mm (=235 mm×sin $\theta_4'$×cos $\theta_4$). This means that in order to locate the ball of the great toe c4 at the operational point of the operational pedal regardless of the above-described position change, it will be necessary to lower the height of the floor board 5 by about 7 mm compared to the first drive characteristic, namely, that the moving correction value at the rearmost position of the driver's seat 1 will be about 4 mm. As a result, the drive characteristic for moving the floor board 5 that is obtained from the total of the going-up amount of the seat cushion 35 and its moving correction value is set in such a manner that the changing rate of the going-down floor board 5 gradually decreases as the driver's seat 1 is moved rearward from the middle position.

According to the driving position adjusting device described above, the seat-position adjusting mechanism 2 is configured so that the seat cushion 35 can be moved upward and the inclination angle α of the seat cushion 35 relative to the horizontal face can become smaller as the seat cushion 35 of the driver's seat 1 is moved forward from the middle position in the adjustable longitudinal range, and the floor moving mechanism 6 is configured so that the height of the floor board 5 can become higher and its changing rate of the height of the floor board 5 can decrease based on the second drive characteristic as the driver's seat 1 is moved forward from the middle position. Thereby, compared to the adjustment based on the above-described first drive characteristic, the forward-movement range of the driver's seat 1 can be properly narrowed, the eye point a1 of the relatively-short driver A can be properly placed on the appropriate eye line L, and the appropriate positions of the foot's sole of the drivers (the respective balls of the great toe a4, b4) can be located at the operational point 11b of the operational pedal such as the accelerator pedal 11 surely, thereby providing the proper operational function of the operational pedal.

Accordingly, the driving position can be properly adjusted regardless of the size of the driver, preventing improperly close approach to a steering handle or a gear-changing shift knob, without any deterioration of the operational function. Further, in a case where the driving position is adjusted by many drivers, i.e., the relatively-middle-height driver B, the position adjustment of the seat cushion 35 and the height adjustment of the floor board 5 can be attained properly, making the sitting position set to the appropriate position substantially.

Further, the seat-position adjusting mechanism 2 is configured so that the seat cushion 35 can be moved downward and the inclination angle α of the seat cushion 35 relative to the horizontal face can become greater as the seat cushion 35 of the driver's seat 1 is moved rearward from the middle position in the adjustable longitudinal range, and the floor moving mechanism 6 is configured so that the height of the floor board 5 can become lower and its changing rate of the height of the floor board 5 can decrease based on the second drive characteristic as the driver's seat 1 is moved rearward from the middle position. Thereby, compared to the adjustment based on the above-described first drive characteristic, the rearward-movement range of the driver's seat 1 can be properly narrowed, the eye point c1 of the relatively-tall driver C can be properly placed on the appropriate eye line L, and the appropriate positions of the foot's sole of the drivers (the respective balls of the great toe c4, b4) can be located at the operational point 11b of the operational pedal such as the accelerator pedal 11 surely, thereby providing the proper operational function of the operational pedal.

Accordingly, the driving position can be properly adjusted regardless of the size of the driver, preventing improperly close approach to the steering handle or the gear-changing shift knob, without any deterioration of the operational function. Further, in a case where the driving position is adjusted by many drivers, i.e., the relatively-middle-height driver B, the position adjustment of the seat cushion 35 and the height adjustment of the floor board 5 can be attained properly, making the sitting position set to the appropriate position substantially.

Herein, instead of the above-described embodiment in which the seat cushion 35 and the seat back 36 are configured to change their positions together when the tilt drive portion 41 of the seat-position adjusting mechanism 2 operates to adjust the inclination angle α of the seat cushion 35, another structure in which only the inclination angle α of the seat cushion 35 is changed, maintaining the upright angle of the seat back 36, may be applied.

However, the above-described structure has a problem in that since only the bending angle θ3 of the thigh portion relative to the upper body changes in accordance with the longitudinal movement of the driver's seat 1, maintaining the upright angle of the upper body, it may be difficult to hold the sitting position of the driver in the proper state, and the eye pint of the driver may not be placed on the appropriate eye line L properly unless the longitudinal movement amount and the vertical movement of the seat cushion 35 is made large. Therefore, it is preferable that the seat cushion 35 and the seat back 36 be configured to change their positions together when the tilt drive portion 41 of the seat-position adjusting mechanism 2 operates to adjust the inclination angle α of the seat cushion 35 like the above-described structure.

Further, instead of the above-described embodiment in which the floor board 5 is moved upward or downward by transmitting the rotational drive force from the drive cables 48 of the slide drive portion 40 to the drive cables 33 of the floor moving mechanism 6, another structure in which there is provided a special drive source to move the floor board 5 may be applied. However, the above-described structure, in which the longitudinal and vertical movements of the seat cushion 35 and the moving of the floor board 5 are adjusted by a single drive source (the drive motor), has an advantage that both adjustments can be achieved at the same time with a simple structure.

Further, instead of the above-described embodiment in which the movable floor portion is comprised of the floor board 5 having the front board 15 and the rear board 17, which are connected via the hinge member 16, and the floor board 5 is driven by the pair of drive links 31 with its front end portion pivotally supported at the rear face of the front board 15, the movable floor portion may be comprised of a single floor board, and also the movable floor portion may be configured to be moved by a slide mechanism in which an engagement pin projecting from a lower face of the floor portion is supported at a guide groove extending obliquely so as to slide.

Also, a connecting axis as a pivotal point of the seat cushion 35 may be provided at the rear portion of the seat cushion 35 and an engagement pin provided at the front portion of the seat cushion 35 may be guided at a guide groove provided at the front portion of the seat rail 39, thereby changing the angle of the sitting face of the seat cushion 35 with its vertically-movable front portion.

Herein, although the driver's seat 1 is moved longitudinally by the drive motor and the floor board 5 is moved vertically with the rotational drive force transmitted via the drive cables 48, 34 in the above-described embodiment, the longitudinal-movement stroke of the seat cushion 35 may be transmitted to a wire that is provided between the driver's seat 1 side and the floor board side and the floor board 5 may be driven by this wire, eliminating the drive motor. In this case, a human force that the driver sitting in the driver's seat 1 applies to the seat for sliding the seat longitudinally may be used as the drive source. Herein, it may be preferable that there be provided a biasing means, such as a coil spring, for biasing the seat cushion 35 forward relative to the seat rails 39, thereby assisting the upward-and-forward movement of the seat cushion 35 with the driver seated in the seat 1.

The present invention should not be limited to the above-described embodiment, but any other modifications and improvements may be applied within the scope of a sprit of the present invention.

What is claimed is:

1. A driving position adjusting device, comprising:
a pedal to be operated by a driver seated in a driver's seat;
a movable floor portion provided for a foot portion of the driver, the movable floor portion comprising a board member on which a heel of the driver's boot is to be placed, the board member being located below said pedal and a front end portion thereof being pivotally supported at a vehicle-body portion via a hinge point;
a seat-position adjusting mechanism operative to adjust a longitudinal position, a height and a seat-face angle of a seat cushion of the driver's seat, the longitudinal position of the seat cushion of the driver's seat adjusted by the seat-position adjusting mechanism being configured to be changeable within an adjustable longitudinal range of the driver's seat;
a movable-floor-portion adjusting mechanism operative to adjust a height of said movable floor portion by changing a positional inclination of the board member around the hinge point within a range between a lowermost position with rear-end down having a greatest inclination and a substantial horizontal position with rear-end up having a smallest inclination; and
a transmission member operationally connecting said seat-position adjusting mechanism to said movable-floor-portion adjusting mechanism,
wherein said seat-position adjusting mechanism is configured so that the adjusted seat-face angle of the seat cushion is changeable in accordance with the longitudinal position of the seat cushion at least in a specified area within said adjustable longitudinal range of the seat cushion of the driver's seat in such a manner that an inclination angle of the seat face of the seat cushion relative to a horizontal face becomes smaller as the seat cushion of the driver's seat is moved forward, and
said movable-floor-portion adjusting mechanism is configured so that the adjusted height of the movable floor portion is changeable depending on a change of the positional inclination of the board member in accordance with the longitudinal position of the seat cushion at least in the specified area within said adjustable longitudinal range of the seat cushion of the driver's seat in such a manner that the height of the movable floor portion becomes higher depending on the inclination of the board member becoming smaller as the seat cushion of the driver's seat is moved forward.

2. The driving position adjusting device of claim 1, wherein said specified area within the adjustable longitudinal range of the seat cushion of the driver's seat is configured to be a front-located area that substantially covers a middle position of the adjustable longitudinal range and a forward area from the middle position, whereby the inclination angle of the seat face of the seat cushion relative to the horizontal face is smaller as the seat cushion of the driver's seat is moved forward from the middle position, whereby the height of the movable floor portion is higher depending on the inclination of the board member becoming smaller as the seat cushion of the driver's seat is moved forward from the middle position.

3. The driving position adjusting device of claim 2, wherein said movable-floor-portion adjusting mechanism is further configured so that a changing rate of the height of the movable floor portion that becomes higher is changeable in accordance with the longitudinal position of the seat cushion in such a manner that the changing rate of the height of the movable floor portion decreases as the seat cushion of the driver's seat is moved forward from the middle position.

4. The driving position adjusting device of claim 1, wherein said specified area within the adjustable longitudinal range of the seat cushion of the driver's seat is configured to be a rear-located area that substantially covers a middle position of the adjustable longitudinal range and a rearward area from the middle position, whereby the inclination angle of the seat face of the seat cushion relative to the horizontal face is greater as the seat cushion of the driver's seat is moved rearward from the middle position, whereby the height of the movable floor portion is lower depending on the inclination of the board member becoming greater as the seat cushion of the driver's seat is moved rearward from the middle position.

5. The driving position adjusting device of claim 4, wherein said movable-floor-portion adjusting mechanism is further configured so that a changing rate of the height of the movable floor portion that becomes lower is changeable in accordance with the longitudinal position of the seat cushion in such a manner that the changing rate of the height of the movable floor portion decreases as the seat cushion of the driver's seat is moved rearward from the middle position.

6. The driving position adjusting device of claim 1, wherein the driver's seat comprises a seat back that is provided substantially in an upright state at a rear portion of the seat cushion, and the seat cushion and the seat back of the driver's seat are configured to change positions thereof together when said seat-position adjusting mechanism operates to adjust the seat-face angle of the seat cushion.

7. The driving position adjusting device of claim 1, wherein the height of the movable floor portion becomes the highest with the board member in the substantial horizontal position when the seat cushion of the driver's seat is moved to a foremost position.

8. The driving position adjusting device of claim 1, wherein said movable floor portion further comprises a rear-side board member, a front end of which is coupled to said board member via a hinge, and a drive link of said movable-floor-portion adjusting mechanism is coupled to the board member for adjusting the height of the movable floor portion.

* * * * *